US012740571B2

(12) United States Patent
Vulin

(10) Patent No.: US 12,740,571 B2
(45) **Date of Patent: *Sep. 22, 2026**

(54) SYSTEMS AND METHODS FOR SOURDOUGH STARTER PRODUCTION

(71) Applicant: Better Bread d.o.o., Pakostane (HR)

(72) Inventor: Karlo Vulin, Zagreb (HR)

(73) Assignee: Better Bread d.o.o, Pakostane (HR)

( * ) Notice: Subject to any disclaimer, the term of this patent is extended or adjusted under 35 U.S.C. 154(b) by 0 days.

This patent is subject to a terminal disclaimer.

(21) Appl. No.: 19/420,070

(22) Filed: Dec. 15, 2025

(65) Prior Publication Data

US 2026/0101904 A1 Apr. 16, 2026

Related U.S. Application Data

(63) Continuation of application No. 19/032,771, filed on Jan. 21, 2025, now Pat. No. 12,520,849.

(60) Provisional application No. 63/564,786, filed on Mar. 13, 2024.

(51) Int. Cl.
*A21D 8/04* (2006.01)
*G05B 13/02* (2006.01)

(52) U.S. Cl.
CPC ......... *A21D 8/045* (2013.01); *G05B 13/0265* (2013.01)

(58) Field of Classification Search
CPC ............................ A21D 8/045; G05B 13/0265
See application file for complete search history.

(56) References Cited

FOREIGN PATENT DOCUMENTS

| | | | | | |
|---|---|---|---|---|---|
| CN | 105746632 A | * | 7/2016 | | A21C 1/00 |
| CN | 108220175 A | * | 6/2018 | | C12Q 3/00 |
| CN | 111112292 A | * | 5/2020 | | G01D 21/02 |
| CN | 219323119 U | * | 7/2023 | | |
| WO | WO-2024219967 A1 | * | 10/2024 | | A21D 8/045 |

OTHER PUBLICATIONS

Arora et al., "Thirty years of knowledge on sourdough fermentation: A systematic review" Trends in Food Science & Technology 108 (2021) 71-83 (Year: 2021).*

* cited by examiner

*Primary Examiner* — Kamini S Shah
*Assistant Examiner* — Michael Tang

(57) ABSTRACT

A system for computer-controlled production of sourdough starters includes a fermenter; a vessel encasing the fermenter and configured to provide a controlled temperature environment on contents of the fermenter; a processor-controlled feeder configured to provide additions of a flour to the fermenter; a processor-controlled water doser configured to provide additions of water to the fermenter; and a sensor in signal communication with a processor and configured to sense parameter values indicative of fermentation maturity of a mixture of flour and water. The processor receives the parameter values, correlates the parameter values with expected parameter values, and based on the correlation, adjusts a rate and quantity of flour addition and water addition to the fermenter to achieve a desired fermentation maturity of the mixture of the flour and the water.

28 Claims, 16 Drawing Sheets

SYSTEMS AND METHODS FOR SOURDOUGH STARTER PRODUCTION

RELATED APPLICATIONS

This application is a continuation of U.S. patent application Ser. No. 19/032,771, filed Jan. 21, 2025, entitled Systems and Methods for Sourdough Starter Production, which in turn claims the benefit of provisional application 63/564,786, filed Mar. 13, 2024, entitled Systems and Methods for Sourdough Preparation. The disclosures of these patent documents are hereby incorporated by reference.

BACKGROUND

Sourdough baking involves fermentation of a mixture through chemical processes enabled by specific microorganisms. Sourdough processes begin with preparation/production of a sourdough starter, sometimes known as a preferment. A sourdough starter is a natural leavening agent used in making sourdough bread. A sourdough starter is essentially a mixture of flour and water that (typically) captures wild yeast and beneficial bacteria (primarily *Lactobacillus*) from the environment. These microorganisms ferment carbohydrates in the flour, producing carbon dioxide, which makes the dough rise, and lactic acid, which gives sourdough bread its distinctive tangy flavor.

Current sourdough starter preparation/production often occurs through an artisanal process that typically requires a knowledgeable baker to apply human experience to generate the desired sourdough composition. This artisanal process is time-consuming, is not suitable to mass production, and results in some noticeable variation in the finished baked product (e.g., sourdough bread), in terms of texture and flavor, for example. Very experienced bakers can produce baked products that are close to identical in terms of flavor and texture, but typical artisanal sourdough baking remains essentially a one-off process. Furthermore, while very experienced bakers can produce very good artisanal sourdough bread, attempts to vary the flavor of a particular baked product may involve much trial and error. Still further, the baked product, and its sourdough starter, may be affected by unknown variations in the ingredients used for the starter.

SUMMARY

A system for processor-controlled production of sourdough starters, includes a fermenter; a double-jacketed vessel encasing the fermenter and configured to provide a controlled temperature environment on contents of the fermenter; a processor-controlled feeder configured to provide additions of a flour to the fermenter; a processor-controlled water doser configured to provide additions of water to the fermenter; a maturity sensor in signal communication with a processor, the maturity sensor configured to sense first parameter values indicative of maturity of the sourdough starter. The processor receives the first parameter values, correlates the first parameter values to expected first parameter values, and based on the correlation, adjusts a rate and quantity of flour addition and a rate and quantity of water addition to the fermenter to achieve a desired maturity of the sourdough starter. In an aspect, the system may employ multiple maturity sensors, with each sensor sensing different maturity indicators.

A sourdough starter production system includes a fermenter configured to receive flour and water, mix the flour and water, and control characteristics of a mixture of the flour and water; a feeder configured to provide initial quantities of the flour to the fermenter and to provide additions of the flour to the fermenter; a water doser configured to provide initial quantities of the water to the fermenter and to provide additions of water to the fermenter; one or more sensors that sense and transmit parameter values indicative of fermentation of the mixture of flour and water; and a processor that executes a program of instructions encoded on a non-transitory, computer-readable storage medium to receive the parameter values, apply the received parameter values to a trained machine learning component, wherein the machine learning component analyzes received parameter values and provides a control signal indicating rates and quantities of flour addition and a rates and quantities of water addition to the fermenter to achieve a desired fermentation of the mixture of flour and water.

A sourdough starter production system includes a fermenter configured to receive flour and water, mix the flour and water, and control a temperature of a mixture of the flour and water; a feeder configured to provide initial quantities the flour to the fermenter and to provide additions of the flour to the fermenter; a water doser configured to provide initial quantities of the water to the fermenter and to provide additions of water to the fermenter; a first sensor that senses first parameter values indicative of bacterial activity in the mixture of flour and water; a second sensor that senses second parameter values indictive of yeast activity in the mixture of flour and water; and a processor that executes a program of instructions encoded on a non-transitory, computer-readable storage medium to receive the first and second parameter values, apply the received first and second parameters to a trained machine learning component, wherein the machine learning component analyzes and correlates the first and second parameter values and provides a control signal indicating rates and quantities of flour addition and a rates and quantities of water addition to the fermenter to achieve a desired fermentation of the mixture of flour and water. In an aspect, the first sensor is a pH senor and the first parameter is pH, and the second sensor is a $CO_2$ sensor and the second parameter is $CO_2$ concentration. In another aspect, the machine learning component correlates the pH value and the $CO_2$ concentration. In yet another aspect, the machine learning component is a large language model. In still another aspect, the large language model is an artificial neural network. In a further aspect, the sensors provide sensed parameter values to an error detection circuit, the error detection circuit identifies a differential (if any) between a sensed parameter value and an expected parameter value, provides the differential to a processor executing a control program, and the processor provides activating signals to components of the sourdough starter production system to adjust an operation of the sourdough starter production system.

The machine learning components may be trained using a combination of unsupervised training, supervised training, and reinforcement training. In an aspect, a system operator and/or a system expert may provide inputs to the machine learning components as part of the supervised and reinforcement training.

DESCRIPTION OF THE DRAWINGS

The detailed description refers to the following figures in which like numerals refer to like items, and in which.

DETAILED DESCRIPTION

Figure 1:
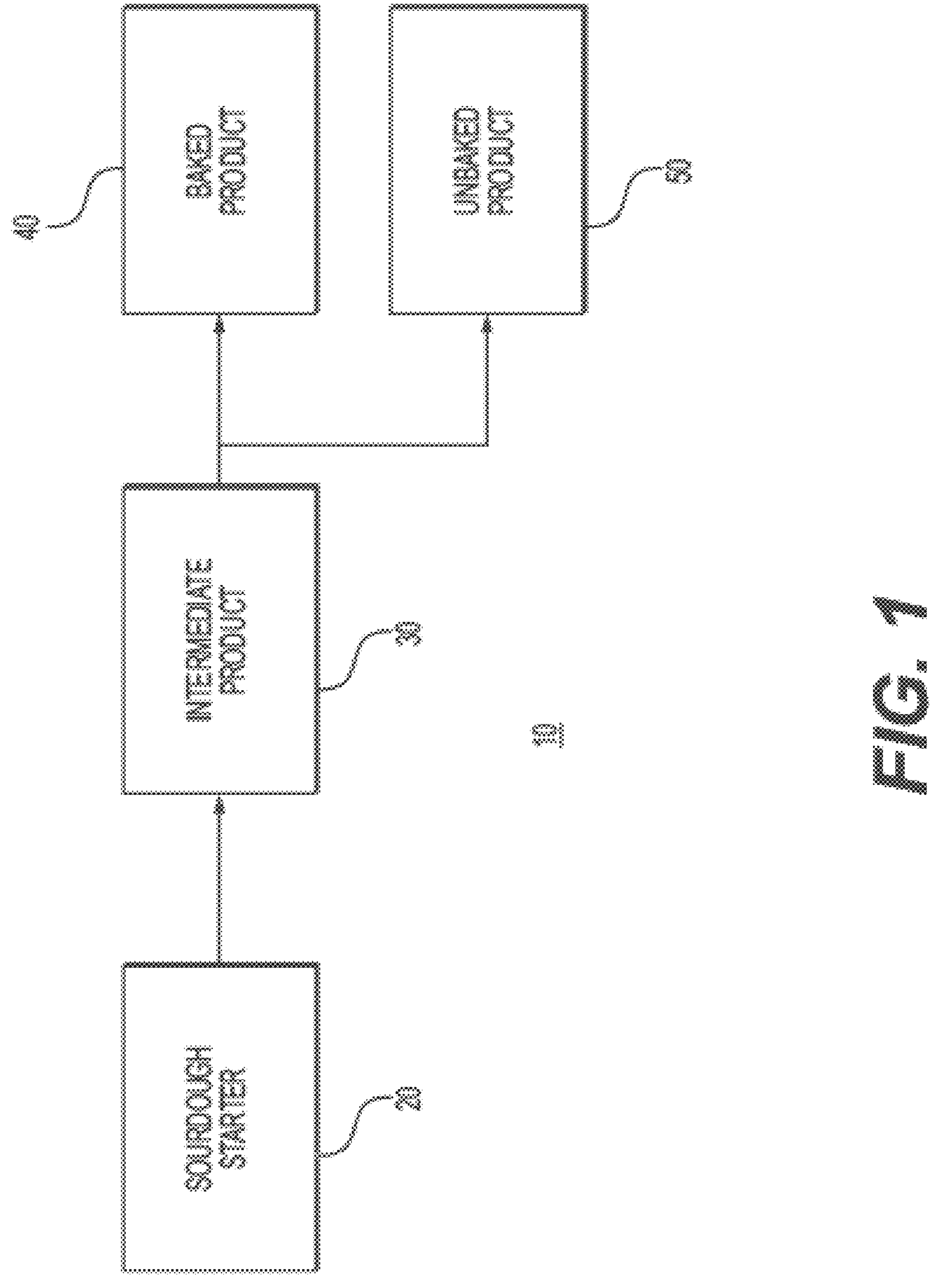
FIG. 1 illustrates an overview of an example sourdough production.

Sourdough bread making has existed for thousands of years, and through those years involved fermenting flour with natural flora present in the flour or present in the surrounding air. Natural flora includes bacteria (typically lactic acid bacteria) found in wild type yeasts. This "natural" fermentation produces a complex flavor in the baked bread. However, natural fermentation is a time-intensive process, requiring 24 hours or more to leaven the dough and develop the bread's unique flavor. Through the work of Louis Pasteur, baker's yeast was invented in the late 19th century. Baker's yeast allowed a very high gas-producing single cell baker's yeast to be selected and grown on a sugar-containing substance. At the end of this fermentation, the yeast was harvested and added at around 2-3% in the dough. Use of baker's yeast allowed dough to be leavened in less than two hours, and in a uniform way. The short proofing times and high consistency led to the industrialization of bread production. However, the resulting "commercial" baked bread had a much less complex flavor than traditional sourdough bread. Thus, traditional sourdough bread making continued as very much an "artisanal" process. Thus sourdough breads differ from commercial breads in the way the breads are fermented. In simple terms, sourdough breads begin with a sourdough starter, also known as a preferment (or preferment), a starter, or a levain, as well as many other names and terms, is a sticky mass containing active, naturally occurring wild yeast. This mass is composed of a mix of water and flour that is fermented by the wild yeast lactic acid bacteria. However, such starter cultures are not dominated by wild yeast; instead, lactic acid bacteria far outnumber wild yeast, typically in a ratio of about 100:1. Both wild yeast and LAB are necessary for a healthy starter fermentation and must be in balance. Furthermore, ingredients and microorganisms in a starter culture are flavorless, and only the byproduct of their activity produces the complex sweet-and-sour flavors found in sourdough breads. Sourdough starter lends breads a greater depth or complexity of flavor than can be found in "commercial" breads due to the longer fermentation time. Furthermore, the flavor profiles of sourdough breads can vary from one location (e.g., San Francisco) to another (e.g., Zagreb) even if both locations use exactly the same ingredients (i.e., the same flour and water).

A sourdough starter is, as the name implies, a starting point, or initial product, in the production of baked or final sourdough products; e.g., sourdough bread. As noted above, sourdough starters are formed, or initiated, by allowing bacteria such as *Lactobacillus* (LAB) and (typically wild) yeast to grow and diversify in a water/flour mixture, where the bacteria and yeast digest carbohydrates to produce microbes that affect the sourdough attributes and ultimately the baked sourdough bread attributes, especially its flavor and texture. Yeasts are the primary leavening agent in bread products, metabolizing to produce carbon dioxide, affecting bread texture. Sources of wild yeast include naturally occurring wild yeast that exists on the surface of wheat grains. When flour is milled from these grains, the milled flour carries a small population of wild yeast. Whole grain flours, like whole wheat or rye, tend to contain more wild yeast (and bacteria) because whole grain flours include the outer bran layers of the grain, which is where much of the microbial life resides. Bacteria metabolize to produce organic acids and other volatile organic compounds, affecting bread flavor. These metabolic processes are influenced by conditions intrinsic to the starter itself, including the starter ingredients (e.g., flour and water), and the starter recipe. These metabolic processes also are influenced by external factors, including baking practices, sourdough starter storage temperature, the amount of starter used during fermentation, the number of feeding steps, and the fermentation time.

In one approach, sourdough starters are produced through a spontaneous growth of bacteria and wild yeasts present in an initial mixture of flour and water, as well as in the mixing environment, including in sourdough vessel and on the person of individual bakers or other people involved in the sourdough starter production. The environmental bacteria and wild yeasts present in a flour-water mixture ferment digestible carbohydrates in the mixture (along with other nutrients). In an aspect, sourdough starter production may include the addition of commercial yeasts to the flour-water mixture. The flour-water mixture is periodically refreshed through a number of flour and water re-feeding steps (also known as backslopping or propagation), during which part of the mixture is discarded. This approach to sourdough starter production is commonly used in artisanal bakeries. The sourdough starter may begin with a near-neutral pH, which steadily declines during fermentation. A finished sourdough starter may be highly acidic (e.g., a pH range of 3.5 to 4.5) due to organic acids produced by lactic acid bacteria (LAB) (the most common bacteria likely to be present in this process) and acetic acid bacteria (AAB). Bakers traditionally determine a starter's "maturity" by assessing its sensory characteristics, such as rise, appearance of bubbles or voids in the mixture, and desired flavors, typically indicated by a pungent odor.

Another approach to sourdough starter production adds a specific bacteria, typically LAB, and in some cases wild yeasts, to the flour-water mixture. This approach may produce a finished sourdough starter faster than using the "spontaneous growth" approach. The additions also may be used to affect the flavor and structure of the final bread product derived from this approach.

In either approach, the sourdough starter is essentially a mixture of flour and water that captures wild yeast and beneficial bacteria (primarily *Lactobacillus*) from the environment. These microorganisms ferment the carbohydrates in the flour, producing carbon dioxide, which makes the dough rise, and lactic acid, which gives sourdough its distinctive tangy flavor. In particular, wild yeast, unlike commercial yeast, exists naturally in the air, flour, and environment and gradually multiplies and becomes more active over time. Lactic Acid Bacteria (LAB) also live in the flour and environment and produces lactic acid and acetic acid as byproducts of fermentation, contributing to sourdough bread's sour flavor. The steps to create a sourdough starter include: (1) mix flour and water using, typically, equal parts (by weight) of flour and water. The starter then is left out at room temperature; (2) feed the starter where, for example, each day, a portion of the starter is discarded, and fresh flour and water are added to "feed" the yeast and bacteria, helping the culture grow stronger; and (3) wait for activity, where, typically after about 5-7 days of feeding, the mixture becomes bubbly and active, indicating that the starter is ready to leaven bread. Once established, a sourdough starter can last indefinitely as long as the starter is regularly fed, either daily or weekly, depending on usage and storage conditions.

Sourdough starter production also is affected by choice of flour type, hydration (water dosing), temperature, time, and re-feeding practices, among other factors. The flour type can affect a starter's structural formation, its effectiveness as a leavening agent, and unique sensory qualities of the starter. Flour helps to introduce microorganisms into the sourdough mixture. Flour also supplies different nutrients (i.e., carbohydrates and amino acids) and non-nutrients (i.e., phenolic acids, amylase, ash), the presence and concentrations of which can influence bacteria and yeast species growth. For example, amylase enzymes present in flour help break complex carbohydrates down into fermentable carbohydrates, producing more rapid bacterial fermentation of the sourdough starter. Flour types differ in their concentrations of amylase. Phenolic compounds and ash are naturally present in flour, to varying degrees, and are thought to affect the acidification rate of sourdough starters, thus impacting microbial growth Just as with flour, the water available in a sourdough starter is important to the biological composition of the sourdough starter. The water available in the starter is referred to as hydration (i.e., the percent of water to flour) or dough yield (i.e., the ratio of flour to water when using 100 grams of flour). Water present in the sourdough starter diffuses nutrients and enzymes. A starter with a higher hydration is thought to produce more LAB activity. The fermentation temperature and storage temperature of a sourdough starter affects the resulting sourdough bread's physical, chemical, and volatile characteristics through the effects of temperature on microbial activity. Time is considered to be the most costly "ingredient" in a sourdough starter. Time may include the overall time from initial starter production and time between feedings, or the frequency of re-feedings. Day-to-day feeding practices and fermentation times for a single sourdough starter result in an ever-evolving microbial composition of the starter, and corresponding changes in the structure and flavor of a finished sourdough bread product.

Limitations of large scale production of consistent baked products that begin with a sourdough starter are discussed herein. Commercial production of sourdough bread, including starter production, requires precise measurements to ensure that each loaf is consistent in size, weight, appearance, and most especially sensory factors including aroma and flavor. Thus, when producing bread for retail or wholesale, product consistency is key. Sourdough starter production, although somewhat understood scientifically, is currently very much a small-batch, artisanal process that requires a knowledgeable baker to apply human experience to generate the desired sourdough composition. The technology currently involved in sourdough starter production is limited to using powered mixers and providing limited environmental controls during production. Thus, current sourdough starter production is limited, at best, to small batches while still being subject to flavor and composition variations in the final baked sourdough product. To overcome limitations, including difficulties in maintaining consistency from batch to batch, in existing sourdough starter production systems and methods, disclosed herein are systems and corresponding methods that involve a decided technological improvement during preparation of a sourdough starter. The technological improvements disclosed herein may include comprehensive use of sensors that monitor the sourdough starter composition, and processors executing computer programs to receive the senor outputs and provide control signals to adjust operation of the sourdough starter production system to affect the sourdough starter maturity parameters including acidity and yeast activity, for example. In an aspect, a computer program is implemented to control characteristics of the sourdough starter through correlation of one or more sourdough maturity (i.e., fermentation) parameters to expected values for those maturity parameters. In an aspect, the maturity parameters may relate to acidity level and rise (i.e., expansion of the sourdough starter). In an example, acidity level is monitored by one or more pH sensors, and rise is monitored by sensing $CO_2$ production. Furthermore, different maturity parameters may be evaluated as a ratio of the different parameters compared to an expected ratio. The technological improvements further may include use of artificial intelligence techniques, such as use of trained large language models, with optional human-feedback, to account for variations in the sourdough starter that may result from ingredient variations and environmental variations, and to adjust the sourdough starter composition to achieve a baked product having a desired flavor and composition, regardless of the shape and size of the baked product. In an aspect, the large language model is implemented to control characteristics of the sourdough starter through correlation of acidity level (pH) and yeast activity ($CO_2$ generation). In another aspect, the trained large language model may control an entire process of producing baked products. In still another aspect, the technological improvements may involve implementation of closed loop feedback systems and networks that identify and correlate error signal(s) to generate sourdough starter system component control signals.

To optimize sourdough starter productions, one important factor to consider is how much time is required for the sourdough mixture to rise. Mixture rise is caused primarily by formation of $CO_2$ gas, which becomes trapped in the gluten. Acidification (pH) is another very important parameter, but process-wise, rise is more important. Sourdough preferment or sourdough culture is made of dozens of different lactobacteria and wild yeasts. The microorganisms all have different metabolisms and byproducts, but the microorganisms may be classified in one of two functional categories. All bacteria dominantly produce acids and all yeasts dominantly produce carbon dioxide. One aspect process control would involve determining how much of each of the acid and yeast variants exists in the sourdough culture. However that kind of exact analysis is slow and expensive to perform, and may be unnecessary for ideal sourdough starter production. In practice, a system, such as that disclosed herein, can approximate the relation of bacteria to yeasts, expressed, for example as a function of their activity. Thus, in an aspect, the herein disclosed system employs a $CO_2$ sensor to measure yeast activity and pH sensor to measure acidity. The sensor data then may be correlated and may provide a ratio, that is, metadata, which implies what the relation is between bacteria and yeasts in the sourdough starter. To determine standardized dynamics of bread dough fermentation, the herein disclosed systems, and corresponding methods, provide this standardized ratio. That standardized ratio may be provided by control of temperature, feeding schedule (flour and water) so as to make the environment more suitable for growth of yeasts or for the growth of bacteria, allowing adjustments to the ratio for the sourdough starter. Moreover, every finished product (baked or unbaked) will have a preferred ratio for rise and acidification that suits its production process, and that results in a desired and intended set of sensory stimuli parameters or organoleptic parameters. Thus, the herein disclosed technological advances, which are non-conventional and non-routine, and in addition, novel and non-obvious, provide solutions to the technological problems of mass production of consistent-flavored and textured sourdough bread products. Furthermore, the technological advances allow customized variations in flavor and texture to meet specific desires while maintaining mass production capabilities. Still further, the technological advances may be applied to any sourdough product regardless of product shape or use, without loss of optimization in terms of flavor, texture, and rate of production.

One aspect of the herein disclosed sourdough starter production is use of artificial intelligence mechanisms to improve production processes and resulting sourdough products. These artificial intelligence mechanisms include machine learning models (MLM) such as large language models (LLMs) and other machine learning models. Thus, as used herein, artificial intelligence (AI) mechanisms is a broad term encompassing any computational system that performs intelligent tasks, with machine learning models being a subset of AI models, and LLMs being a specialized subset of machine learning models. A machine learning model refers to any computational system trained to recognize patterns and make decisions based on data. Machine learning models can take many forms, depending on their design and the type of data they process. Some common types include: Linear models (e.g., linear regression, logistic regression); Decision trees; Support Vector Machines (SVMs); and Neural networks (e.g., feedforward networks, convolutional neural networks) A large language model is a specific type of machine learning model, typically based on deep learning architectures (e.g., transformers), that is trained on large amounts of, typically, textual data. Large language models are appropriate for understanding, generating, and interacting with natural languages such as generating text, answering questions, summarizing content, translating languages, etc. However, LLMs may be trained for more specialized applications, including those related to sourdough starter production.

Figure 6:
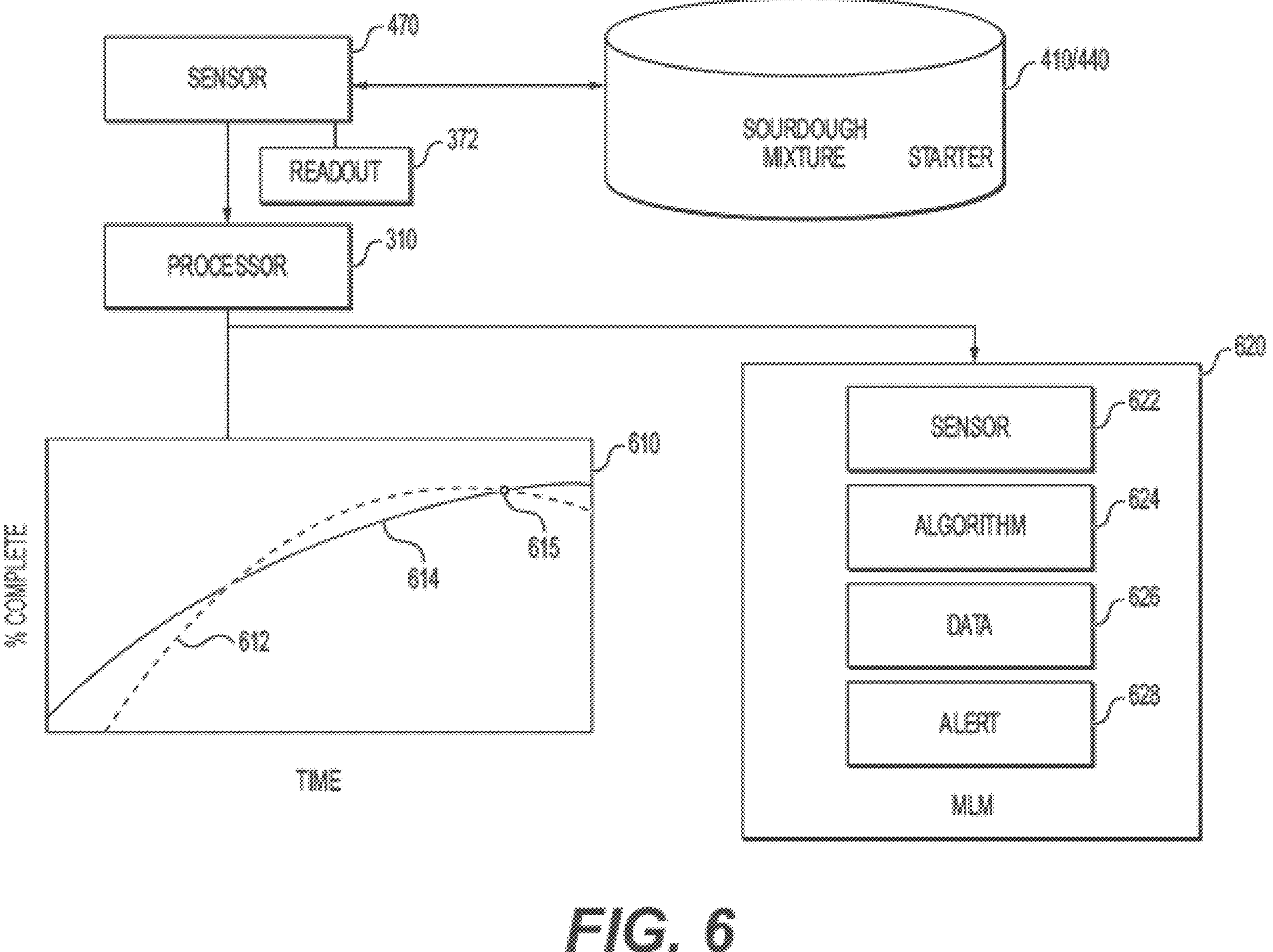
FIG. 6 illustrates an example application of a trained machine learning model (MLM) to control operation of the example systems and components of FIGS. 3 and 4A.

In an aspect, the sourdough starter production system includes a sourdough starter control subsystem that operates to execute, or assist in execution of, one or more sourdough production routines. In this respect, the control subsystem may include a sensor and reporting module and a related actuator module. In certain aspects, the control subsystem also includes a supervised and non-supervised machine learning module, a large language model module, a vector database and search engine module, and other modules, features, and components that cooperate to control and optimize the sourdough starter process in order to maintain consistency, improve efficiency, and manage the balance of microorganisms in the sourdough starter. An example application of a MLM is illustrated in FIG. 6. In an aspect, a sourdough starter production system control subsystem is used to monitor and control sourdough fermentation variables, including (a) temperature and humidity, in which components are used to monitor and regulate the temperature and humidity of the environment where the starter is stored—these variables are critical for controlling the rate of fermentation and the balance between yeast and lactic acid bacteria; (b) pH and acidity, in which sensors read pH levels of the sourdough starter to ensure that the acidity remains within a desired range, with the pH sensors sending data to the control subsystem, which then may adjust, or provide a notice to adjust, the feeding schedule, temperature, or sourdough starter hydration to optimize the microbial balance for the desired flavor and texture of the baked sourdough bread; and (c) hydration level, by which the control subsystem operates to ensure that the starter is consistently hydrated to a desired level. This is crucial because the hydration level of the starter affects the fermentation process, flavor, and dough texture. The control subsystem also is used to control feeding schedules using automated feeding routines, including determining the best times to feed the starter based on real-time data such as temperature, activity level (e.g., how much the starter is rising and falling), compared to past performance and historical data to ensure optimal yeast and bacterial growth. The control subsystem may adapt to specific production needs and adjust the feeding schedule and quantity of the sourdough starter based on a bakery's production needs. The control subsystem may perform predictive analytics. For example, the control subsystem may use historical data from previous batches to predict how a sourdough starter will behave under different conditions. The control subsystem may analyze variables such as temperature, feeding times, and ingredient types in a current sourdough starter to predict when the starter will be at its optimum for incorporation into dough, thereby ensuring consistent results across large-scale sourdough production runs. The control subsystem may be used to improve batch-to-batch consistency, thereby addressing one of the biggest challenges in sourdough baking is the variability in starter performance, such variability being the result of multiple factors including environmental changes, ingredient variability, human operator performance, and other factors. The control subsystem includes modules, features, and components that may be employed to "learn" from past batches and fine-tune conditions for each new sourdough starter. The various modules, features and components of the control subsystem provide a quality control function in which the various sensor-provided data are analyzed to detect indications of sourdough starter imbalances, such as undesirable bacterial overgrowth or underperformance of wild yeast, enabling corrections to be made before the problems are irreversible. The control subsystem may incorporate real-time data feedback in which real-time data are provided to integrated real-time feedback loops, using cameras, sensors, and other monitoring components to constantly evaluate the sourdough starter's rise, bubble formation, and activity level and then then make automatic adjustments to fermentation conditions or suggest manual interventions.

In a related aspect, the sourdough starter control subsystem may be integrated with or may cooperate with a sourdough bread baking control subsystem. In this way, the sourdough starter control subsystem may receive real-time and historical data related to the quality and characteristics of baked sourdough products, and may use those data inputs to adjust or recommend adjustments to current sourdough starter productions. Accordingly, the sourdough starter control subsystem may learn which factors lead to the best bread outcomes, such as perfect crust texture, crumb structure, and sourness, and adjust the starter process accordingly. Furthermore, the sourdough starter control subsystem may use the data to suggest modifications to the recipe or fermentation process to account for changes in flour quality, environmental conditions, or customer preferences.

As noted above, the sourdough starter control subsystem may employ, or be operated, in conjunction with one or more machine learning (ML) components, including a trained, large language model (LLM) and other machine learning models (MLM). One such LLM is a trained artificial neural network. Another LLM may be based on natural language processing, an example of which could be a "conversational" LLM. In an aspect, the sourdough starter control subsystem may include both a conversational LLM and an artificial neural network. The LLM may include components used to analyze and assess large quantities of data related to sourdough starter production, including data related to ingredients used in the sourdough starter production process. The machine learning components may employ models that use the data assessments to automate operation of the sourdough starter production by providing inputs to the sourdough starter control subsystem.

The herein disclosed sourdough starter systems employ machine learning to optimize, automate, and improve the consistency of the fermentation process. An example machine learning component includes software programs and models, stored on a non-transitory, computer-readable storage medium. The example machine learning is trained through self-learning, supervised training, and expert feedback training. In an aspect, the machine learning component is installed locally at specific sourdough bakeries or similar facilities. In another aspect, certain modules and devices of the machine learning components are provided locally while other components are provided remotely, such as in the cloud. In one specific aspect, a cloud-based central computing and data storage module hosts sourdough starter preparation programs and data while specific sourdough preparation facilities are outfitted with local programming and data to interface with the central computing and data storage component. In this specific aspect, the cloud-based central computing and data storage components functions as a software as a service (SaaS) component. In an aspect, the machine learning component is executed to (1) monitor and predict sourdough fermentation activity; (2) optimize sourdough feeding schedules; (3) provide environmental control and automation; (4) improve consistency across Sourdough batches; (5) optimize ingredient use; (6) control flavor profiles; (7) scaling production; and (8) monitoring operation actions and minimizing human error.

Monitoring and Predicting Fermentation Activity: A machine learning component makes possible processor-based monitoring and analysis of key variables in the sourdough fermentation process. The machine learning component may use the analysis to predict how the sourdough starter will behave over time. Real-time Data Collection and Prediction: the machine learning component receives inputs from sensors that read values of various parameters, such as temperature, humidity, pH levels, starter rise, and dough activity. The machine learning component analyzes the data to track how these parameters influence yeast and bacteria activity. Predicting Starter Activity from Historical Data: using historical data, the machine learning component may predict the sourdough starter's peak activity time, fermentation rate, and readiness for use, thereby helping bakers determine the best time to incorporate the starter into dough for optimal rise and flavor. Pattern Recognition: the machine learning component may recognize patterns in real time data that may not be obvious to bakers. For example, small fluctuations in temperature or feeding frequency can affect the starter's performance, and the machine learning component may detect these relationships and may accordingly adjust, or suggest adjustments to, the sourdough starter process.

Optimizing feeding schedules: an important task in maintaining a sourdough starter is regular feeding. The machine learning component may be used to optimize the feeding schedule based on the starter's activity and environmental factors. By implementing an adaptive feeding model, the machine learning component may track how the sourdough starter responds to different feeding intervals, quantities, and types of flour. Over time, the machine learning component may identify ideal feeding schedules for maintaining the health of the starter under different conditions, such as changes in temperature or humidity. The machine learning component may be used to control the feeding system to automatically adjust the feeding frequency and quantities of ingredients to optimize fermentation. For example, during periods of slower yeast activity (e.g., in colder environments), the machine learning component may recommend or implement more frequent feedings or adjustments to the flour composition.

Environmental control and automation: the machine learning component may be used to optimize environmental conditions such as temperature, humidity, and airflow to ensure consistent fermentation. Temperature Control: the machine learning component can analyze the relationship between temperature and fermentation speed, adjusting the environment to maintain optimal yeast and bacterial activity. For example, if fermentation is proceeding too slowly due to a drop in temperature, the machine learning component may adjust the temperature in the fermenter to speed up the process. Humidity and Airflow: the machine learning component may control the humidity and airflow in fermentation chambers. Too much moisture or improper airflow can affect fermentation, and the machine learning component may dynamically adjust these factors based on the real-time status of the sourdough starter. Predictive Maintenance: the machine learning component may predict when environmental controls/components/systems (like fermentation chambers) need maintenance or calibration to ensure optimal performance and prevent downtime or starter inconsistency.

Improving consistency across batches: one challenge in large-scale sourdough production is achieving consistent results across multiple batches. Wild yeast and bacteria can behave unpredictably due to environmental changes, ingredient variations, and other factors. Machine learning may maintain consistency by learning from past batches and adjusting the process accordingly. Learning from Historical Data: by analyzing data from past batches of bread, the machine learning component may identify which conditions led to the best results. The machine learning component then may apply this knowledge to future batches, making adjustments to maintain consistency in rise, flavor, and texture.

Automating Adjustments: when variances in dough rise or flavor are detected, the machine learning component may automatically adjust fermentation times, feeding schedules, or environmental controls to ensure that the end product meets the bakery's quality standards.

Optimizing Ingredient Use: Machine learning models may be employed to optimize use of ingredients (primarily flour and water) while maintaining starter quality. Flour Hydration Levels: the machine learning component may include models that analyze how different hydration levels affect the sourdough starter's performance. By learning from these data, the machine learning component may recommend (or adjust) the ideal water-to-flour ratio for different environmental conditions or types of flour, optimizing the starter's hydration for better fermentation. Flour Selection: the machine learning component also may optimize blends of flours used in the sourdough starter (e.g., whole wheat, rye, or white flour). By tracking how different flours influence fermentation activity, rise, and flavor, the machine learning component may suggest the best combinations for consistent results.

Controlling Flavor Profiles: Sourdough flavor is highly dependent on the balance between wild yeast and lactic acid bacteria, which is influenced by variables like temperature, feeding schedules, and flour type. The machine learning component may help control the flavor profile of sourdough by monitoring and adjusting the fermentation process. Flavor Prediction: based on real-time data from sensors (e.g., pH sensors), the machine learning component may predict how sour or mild the bread will be, depending on the lactic acid and acetic acid levels produced by the bacteria. Bakers then can adjust the fermentation time or temperature to achieve the desired flavor. Customizing Fermentation: the machine learning component may help bakers create different sourdough flavor profiles through fine-tuning the fermentation process. As an example, by slowing fermentation at a specific point, the sourdough production system may be controlled to encourage more lactic acid production, leading to a tangier flavor.

Scaling Production: As used herein, scaling sourdough starter production refers to either changing (increasing or decreasing) a size of an individual batch, or operating multiple fermenters in parallel. Scaling sourdough production while maintaining quality can be challenging due to the variability of wild yeast and bacteria. The machine learning component may help scale the process by optimizing workflows and automating key steps. Optimizing for Large Batches: the machine learning component can analyze how starter behavior changes when scaling up from small batches to large batches. By adjusting feeding schedules, fermentation times, and environmental conditions, the machine learning component may ensure consistent results regardless of batch size. Automated Single and Multiple (Parallel) Batch Tracking: as noted above, the machine learning component may be used to track and analyze a single sourdough starter batch. In a similar manner, the machine learning component may be used to track and analyze multiple (parallel) batches of sourdough starter in real time, adjusting conditions for each batch based on sensor readings for individual batches.

Reducing Human Error: The machine learning component may be used to reduce the chance of human error in maintaining sourdough starters. Automating Routine Tasks: tasks such as feeding the starter, monitoring temperature, and adjusting fermentation times may be automated based on machine learning models. This reduces the likelihood of mistakes and ensures that the starter is consistently maintained under optimal conditions. Data-Driven Decision Making: rather than relying on intuition or experience alone, bakers can use machine learning models to make data-driven decisions. This can improve the precision of fermentation and lead to more predictable outcomes. Finally, the machine learning component may monitor human operator actions to determine if those actions are (1) consistent with historical actions, and (2) coincide with the machine learning model's analysis of optimum operations.

A further aspect of sourdough production scaling and consistency may be extended to operations of associated bakeries at multiple, geographically-diverse locations. In an aspect, the machine learning model and corresponding components may be implemented "in the cloud," with each bakery having access to the cloud-based services and the individual bakeries sharing their individual "lessons learned." Moreover, implementation of these models and components across multiple bakeries may ensure more consistent sourdough production for all associated bakeries. In the previously-mentioned example of sourdough baking in San Francisco on the one hand and Zagreb on the other, both locations may access a single "master" knowledge base provided "in the cloud" at a central or single location to identify or access a specific "recipe" for a sourdough starter, and further may access data related to production according to the selected recipe in each of the two locations (San Francisco and Zagreb), thereby taking into account process and ingredient variations required to achieve the same flavor profile and texture based on, for example, observed/actual bacteria variations between the two locations. For example, production of the same sourdough starter in Zagreb may require more hydration than production of the sourdough starter in San Francisco.

In addition to the above-noted technological improvements, the herein disclosed systems and methods may implement a ledger system, which may be in the form of a distributed ledger such as a blockchain. In an aspect, the ledger may be accessed by a trained large language model, and may provide an immutable record of ingredients used during the sourdough starter production process, sensor readings, and metadata associated with production with each batch of sourdough. The ledger may be made (partially of completely) available to bakers, suppliers, distributors, and retailers, and may be used to track ingredients and baked products, providing data as to the provenance of the ingredients and information regarding the baked products. In an aspect, each associated bakery has access to the ledger, and/or may maintain a local copy of the ledger.

FIG. 1 illustrates an overview of an example sourdough-based baked product production. In FIG. 1, example sourdough-based baked production 10 includes sourdough starter production 20, sourdough intermediate product shaping 30, and sourdough baking 40. Sourdough starter production 20 is disclosed in more detail with respect to the Figures that follow. Sourdough product shaping 30 may be performed by computer-controlled machine operation. In an aspect, a computer may implement a machine learning model (MLM) to control the intermediate product shaping, with the MLM controlling the shaping based, in part, on metadata obtained during the sourdough starter production 20. Similarly, the sourdough baking may be a computer-controlled operation, and may involve metadata from sourdough starter production 20 and intermediate product shaping 30. Following shaping, the intermediate product may be baked, 40. In an aspect, the production 10 may end with an intermediate product 50 that is not baked, but that instead is provided in un-baked condition for subsequent baking by an end-user.

Figure 2:
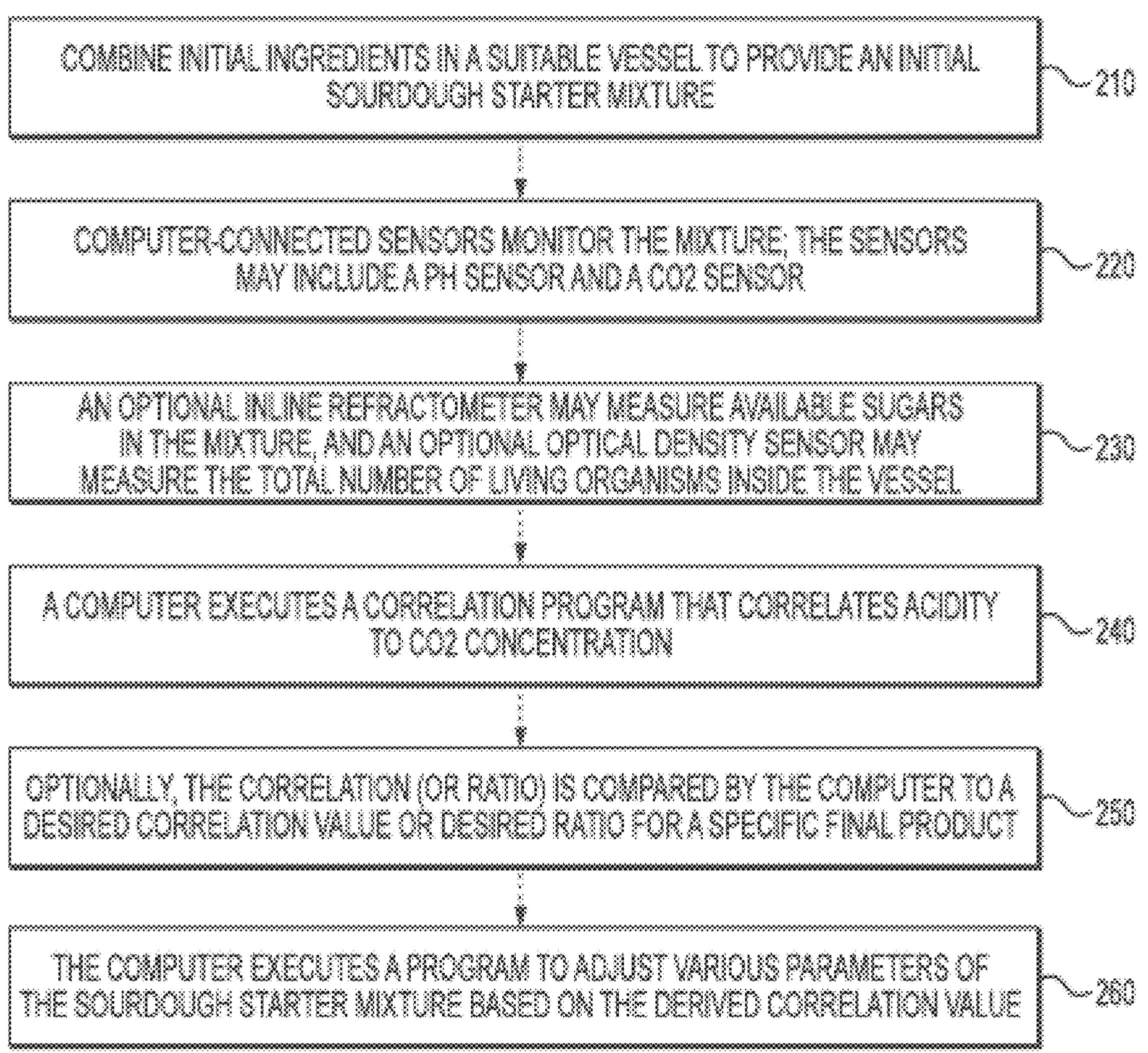
FIG. 2 illustrates an overview of an example sourdough starter production.

FIG. 2 illustrates an overview of an example sourdough starter production process. As one skilled in the art would appreciate, the desired characteristics of the sourdough starter may depend on the desired characteristics (e.g., flavor, texture) of the finished product; that is, a baked product, or characteristics of baked product resulting from end-user (e.g., a consumer, restaurant) baking of an unbaked product. In FIG. 2, computer-implemented process 200 includes, step 210, a computer controlling system components to combine initial ingredients in a suitable vessel and produce an initial sourdough starter mixture. In step 220, sensors monitor the sourdough starter mixture to determine its degree of fermentation or maturity. The sensors may include a pH sensor and a $CO_2$ sensor, for example. The sensors may be computer-controlled. In optional step 230, an inline refractometer may measure available sugars in the mixture, and an optical density sensor may measure the total number of living organisms inside the vessel, with both measures indicating a degree of maturity of the sourdough starter. In step 240, the computer may execute a correlation program that correlates acidity (e.g., pH) to $CO_2$ concentration, i.e., produces a correlation curve that may then be expressed in terms of a ratio or a percent complete. Moreover, the correlation curve may be compared to an idealized, or historical correlation. Thus, in optional step 250, the correlation (or ratio) is compared (see for example, curves 612 and 614 of FIG. 6) by the computer to a desired correlation value or desired ratio for a specific final product (different final products may have differing correlation values). In step 260, the computer executes a program to adjust various parameters of the sourdough starter system based on the derived correlation value. For example, the computer may control actuators to increase or decrease flour and water feed rates into the vessel, and temperature and pressure within the vessel.

In an aspect, the above-described computer-implemented process 200 may be based at least in part on the application of one or more machine learning models, such as a large language model, to develop various correlation curves and to analyze historical data (from sourdough production facilities, for example), best practices from experienced bakers, and other inputs.

Figure 3:
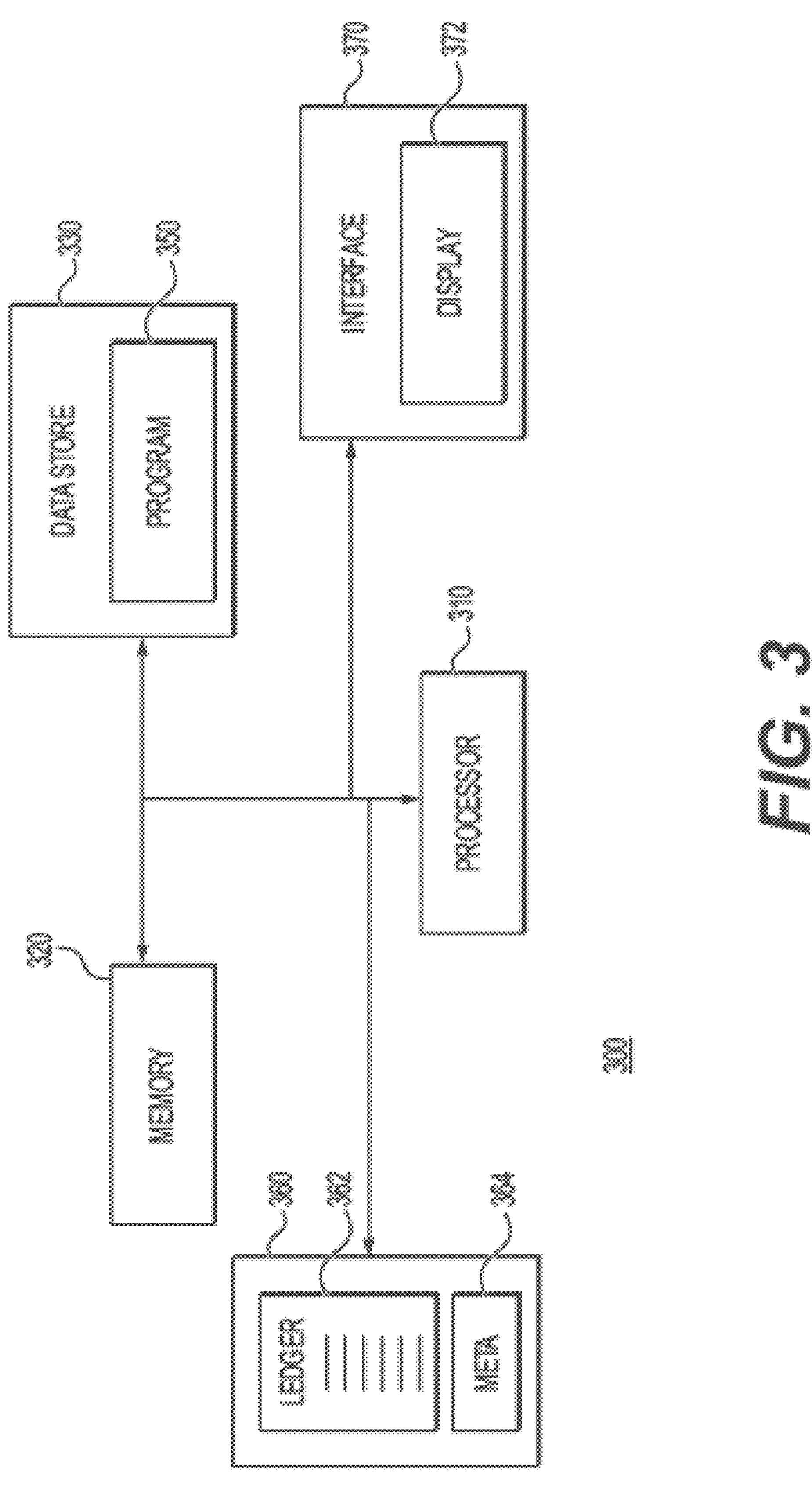
FIG. 3 illustrates an example system for sourdough starter production.

FIG. 3 illustrates an example computer-based control system for sourdough production. In FIG. 3, control system 300 includes processor 310, memory 320, and non-transitory, computer-readable data store 330 on which is stored a program 350 of instructions for operating various components of a sourdough starter production system, as well as storing data related to operation of the sourdough starter production system. In addition, the system 300 may implement a ledger system 360 (e.g., a block chain), which also may be stored in the data store 330, or in a separate data store. The ledger system 360 may include a permissioned or permissionless ledger. In an aspect, ledger 362 is a permissioned, distributed ledger in which multiple entities involved in the sourdough starter production may access data contained in, and upload data to the ledger 362. The ledger 362 is, in an example, immutable. In addition to immutable ledger 362, the ledger system 360 may store metadata 364 related to one or more ledger entries. In an aspect, the program 350 of instructions may include a machine learning model (MLM) and example of which is a large language model (LLM) (not shown) that the processor 310 executes to control aspects of operation of certain components of the system 300. In an aspect, the LLM may be, or may include a "conversational" LLM and/or an artificial neural network. The system 300 may include a user interface 370, which may provide information to and receive command from, a human user, by way of display 372. In an example, the system 300 may be implemented as a component of sourdough starter production system 400 (shown in FIGS. 4A and 4B).

Figure 4A:
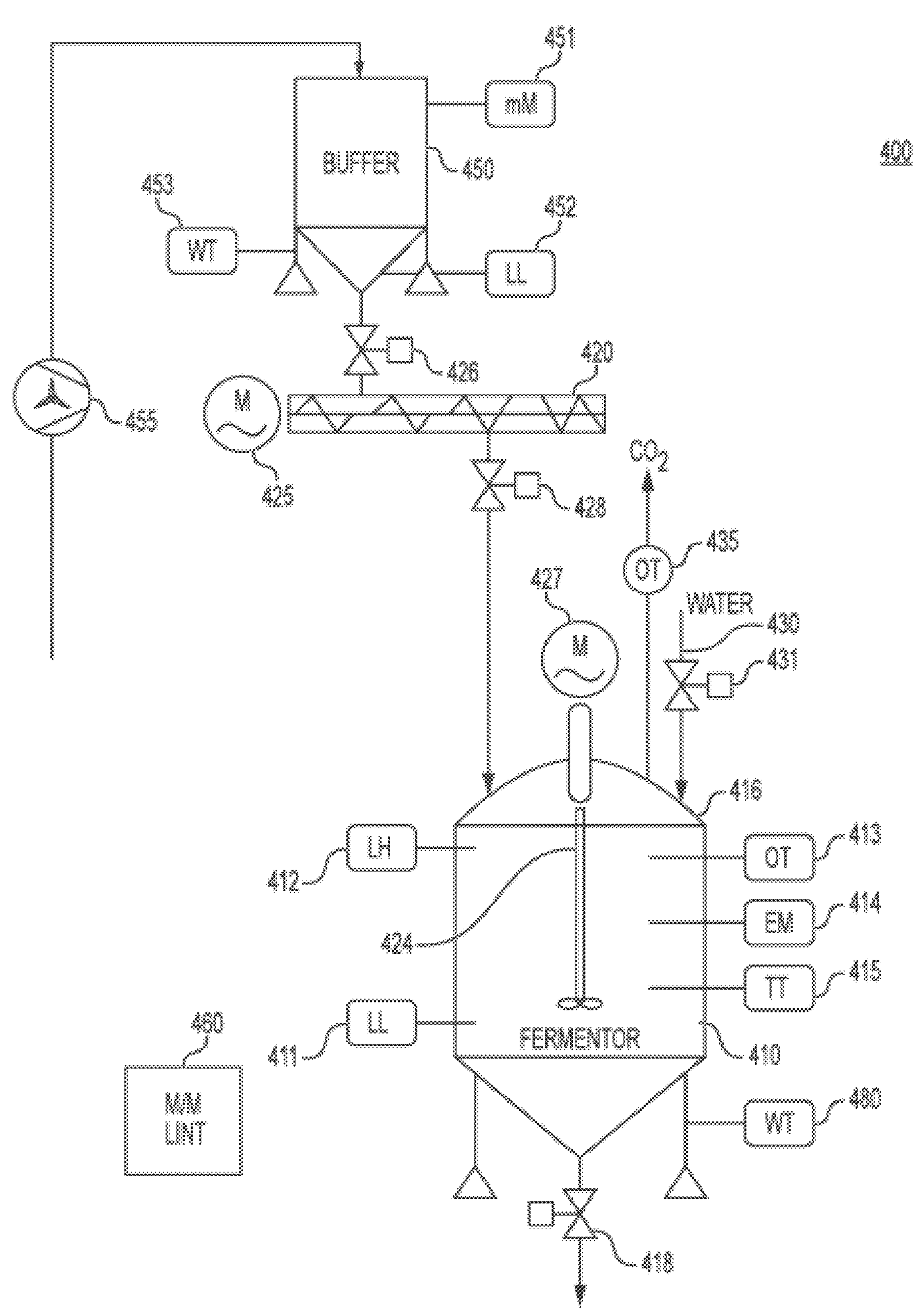
FIGS. 4A-4C illustrate an example system and components of the system for sourdough starter production of FIG. 3.

FIG. 4*a* illustrates example system and components for sourdough starter production. In FIG. 4A, computer-controlled sourdough starter production system 400 includes fermenter 410, which may be contained in, for example, double-jacketed vessel 440 (see FIG. 4B) for temperature control. The fermenter 410 may include hinged or removable cover 416 The fermenter 410 includes mixer 424 driven by motor 427. System 400 further includes motor 425 operated feeder 420, configured to supply flour and other solids to the fermenter 410 through actuator-controlled valve 428, and water doser 430, configured to supply water to the fermenter 410 through actuator-controlled valve 431. The motor operated feeder 420 may be computer controlled, and may supply materials according to a program executed by a processor, such as processor 310 of FIG. 3. In an aspect, the processor 310 may train and subsequently execute a trained machine learning model (MLM) such as a large language model (LLM) to control feed rates of the materials. In an aspect, the machine operated feeder 420 may be a screw-type feeder, a conveyor, a vacuum conveyor, an auger, or any materials feeder capable of providing the desired materials in the desired quantity and at the desired rate and/or periodicity. The water doser 430 also may be machine operated and computer-controlled. The processor 310 may execute program 350 to control supply of water, including a desired quantity at a desired rate (volumetric flow rate) or though batch addition, including by remote operation of valve 431. A water supply (not shown) may be gravity fed or pressurized. The water supply may include a filter and UV-C disinfection components. The water supply may be controlled to supply water at a desired temperature. In an aspect, the processor 310 may execute the program 350 to supply water at a temperature chosen by the processor 310 based on, for example, conditions within the fermenter 410, including bacteria count and yeast activity in the sourdough mixture. The system 400 further may include an air supply (not shown), configured to supply air to the fermenter 410. The air may be used to affect conditions within the fermenter 410 so as to enhance the fermentation process. For example, the air may be provided to pressurize the fermenter 410. In an aspect, the system 400 may include a vacuum system (not shown) to establish a vacuum in the fermenter 410 for a portion of the fermentation process. Certain components of the system 400 may include actuators that operate under direction of the processor 310 to control the components. For example, actuators may be provided for water dousing, flour dousing, heating, and cooling, mixing and aeration, and pressure control. The system 400 further includes machine-machine interface 460, which provides signals from/to processor 310 and corresponding components of the system 400, including sensors. The sensors may be deployed and employed to determine the maturity (e.g., degree of fermentation) of the sourdough starter and its continued fermentation level. In an aspect, the sensors may include a first sensor that senses a parameter value indicative of a quantity of bacteria in the sourdough mixture. In a more specific aspect, the first sensor may sense acidity. In an example, the first sensor may be pH sensor 414, and the sensed pH is indicative of the quantity of bacteria in the sourdough mixture. The sensors may include a second sensor that senses a parameter value indicative of yeast activity in the sourdough mixture. In an aspect, the second sensor may sense expansion of the sourdough mixture. In an example, the second sensor may be $CO_2$ sensors 413 and 435. In another example, the second sensor may be configured to sense a vertical rise of the sourdough mixture. The system 400 also may include temperature sensor 415 and pressure sensors (not shown) to sense temperature and pressure in the vessel 440. Other sensors may be implemented in the system 400, including in components other than the fermenter 410, such as high and low level sensors 412 and 411, respectively. The fermenter 410 includes an actuator-operated drain valve 418 that may be opened to drain a portion of a sourdough starter during a refeeding operation. System 400 also includes scale (i.e., weight sensor) 480 to provide weight information for the sourdough starter mixture. Finally, system 400 includes buffer 450, which holds and dispenses solids, specifically flour, that is used in the sourdough starter production process. The buffer 450 receives flour through motor driven device 455 and dispenses flour though actuator-controlled valve 426 to feeder 420. The buffer 450 is instrumented with high and low level sensors 451 and 452, respectively, and with scale 453. All sensors shown in FIG. 4A are capable of communication with man-machine interface 460, and all valves are controllable by, and provide position information to, man-machine interface 460. The sensors and valves also may be configured for communication with other remote computing devices, as discussed herein, including with respect to FIGS. 12 and 13.

Man-Machine Interface 460 may be portable (as illustrated) or may be incorporated into a stationary control center for operation of the sourdough starter production system 400. In either example, the interface 460 may allow an operator (e.g., user 1002—see FIG. 11) to interact with components of the system 400. In one aspect, such interaction may be facilitated by use of a machine learning model (MLM) such as a "conversational" large language model (LLM) with accepts natural language inputs and produces corresponding outputs (verbal and non-verbal). The interaction may be facilitated further by adoption of an LLM trained on specifics of the system 400, or by use of other trained machine learning models. Such models are discussed herein. In an aspect, the interface 460 may present user 1002 with options for operating the system 400. In one option, the system 400 is operated in a manual mode with the machine learning models providing suggestions and alerts for the user 1002 to consider. In another option, the system 400 is operated in a largely automated fashion, with certain steps reserved for execution by the user 1002. In still another option, the system 400 is operated in a fully automated fashion, with the user 1002 receiving alerts and readings so as to monitor system operation. In one aspect, the user 1002 may select a sourdough starter recipe from a menu of approved recipes. The machine learning models then may execute to ensure that the proper materials (e.g., a specific flour) are available and may set the initial conditions for operation of the system 400. In another aspect, the user 1002 may select specific ingredients or specific flavor profiles, and the machine learning models will identify the required ingredients and set the initial conditions for system operation. Setting the initial conditions may include, for example, mixing speed, ratio of water to flour, and quantities of ingredients to use. The machine learning models also may present a timeline for starter production and present the timeline to the user 1002 over the interface 460. In a similar manner, all aspect of operation of the system 400 may be controlled through and monitored over the interface 460. FIG. 6 illustrates example aspects of such control and monitoring. In another aspect, all operations are controlled by. information presented over, and interactions with the interface 460 may be recorded and preserved as a record of a specific sourdough starter production. The record may be stored in a block of distributed ledger 362 (see FIG. 3). The stored record then may be used in subsequent training of the machine learning models associated with the sourdough starter production system 400.

Figure 4B:
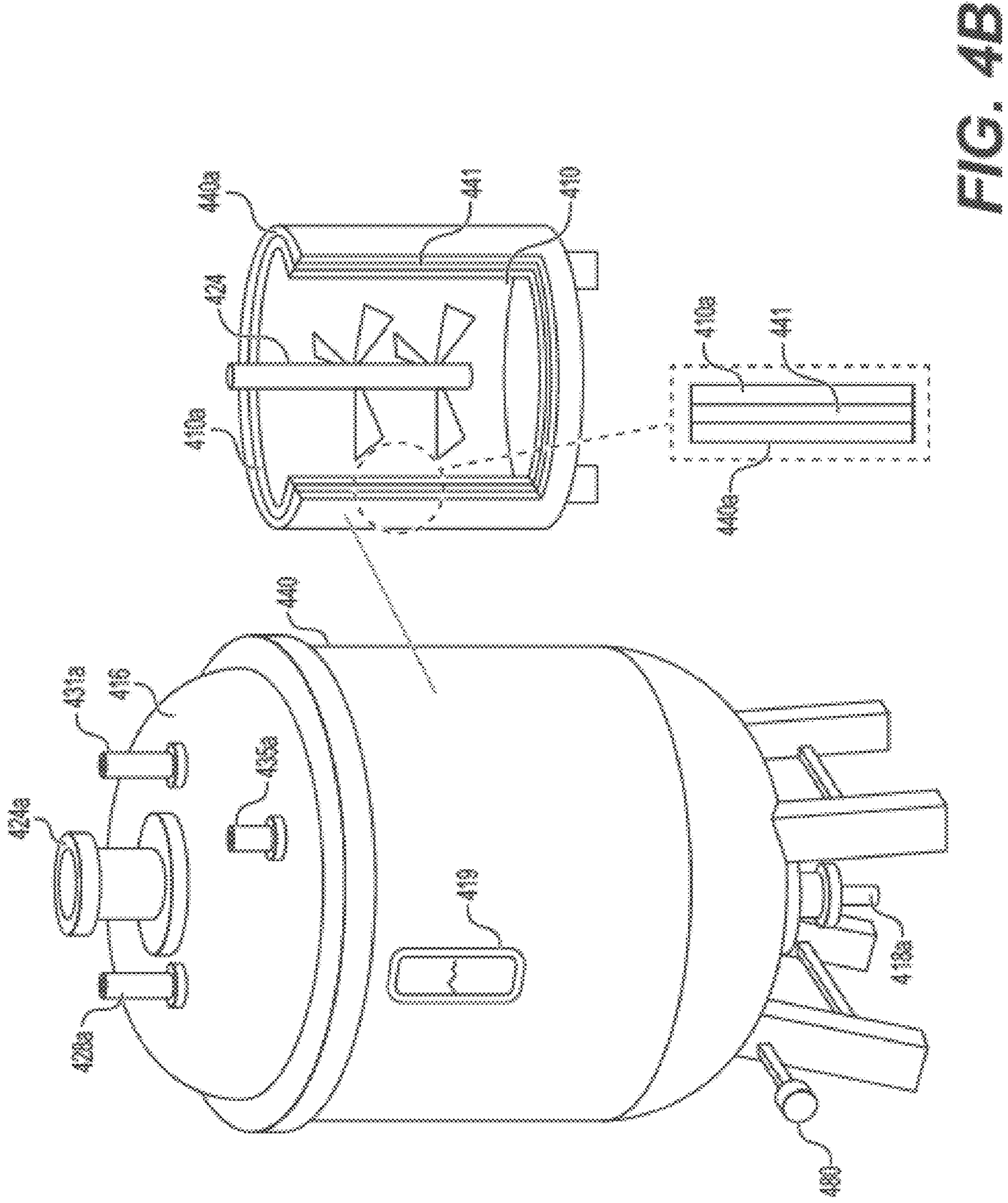

FIG. 4B illustrates additional aspects of the sourdough starter production system 400. In FIG. 4B, the fermenter 410 is encased in double-jacketed vessel 440, shown in partial cutaway view. The double-jacketed vessel 440 allows for the application of cooling (the sourdough starter production process being generally exothermic) or heating to the internally-contained fermenter 410 by, for example, passing cooled liquid between (in channel 441) the double walls of the vessel 440/fermenter 410 (see expanded cross sectional view). As an example, cooling water may be circulated between walls 410*a* (of the fermenter 410) and 440*a* (of the outer vessel 440). Other double-jacked configurations are possible, as are other mechanisms for controlling the temperature of the sourdough starter. The vessel 440 also is shown with an optional sight glass 419, which provides operators with a visual indication of fluid level within the fermenter 410. The sight glass 419 also provides operators a view of the "bubble" structure of the rising sourdough starter. Alternately, or in addition, the sight glass 419 may be equipped with a camera or similar imaging device that provides a view of the rising sourdough starter for image processing to processor 310 to enable to enable the processor 310 to further analyze the maturity of the sourdough starter by the processor 310 comparing an observed "bubble" or "void" pattern (see FIG. 4C) to expected values based on an elapsed fermentation time. The vessel 440/fermenter 410 is shown provided with scale 480. Finally, the fermenter 410 is shown fitted with an optional double-tiered stirrer 424, which may minimize stratification of the sourdough starter in the fermenter 410. The stirrer is coupled to motor 427 (see FIG. 4A) through connector tube 424*a*. Similarly, flour addition is facilitated by solids tube 428*a* and water addition by douser tube 431*a*. Finally, $CO_2$ off gassing is facilitated by tube 435*a*. Other means and mechanisms may be employed for flour and water additions, connections to stirrer 424, and other purposes. In an example, appropriate connections in top hinged or removable cover 416 may be disconnected and the cover 416 opened or removed for flour and water additions. Finally, discharge/drainage tube 418*a* may be used to connect to valve 418 (FIG. 4A) for draining a portion of the sourdough starter prior to or as part of refeeding operations.

Figure 4C:
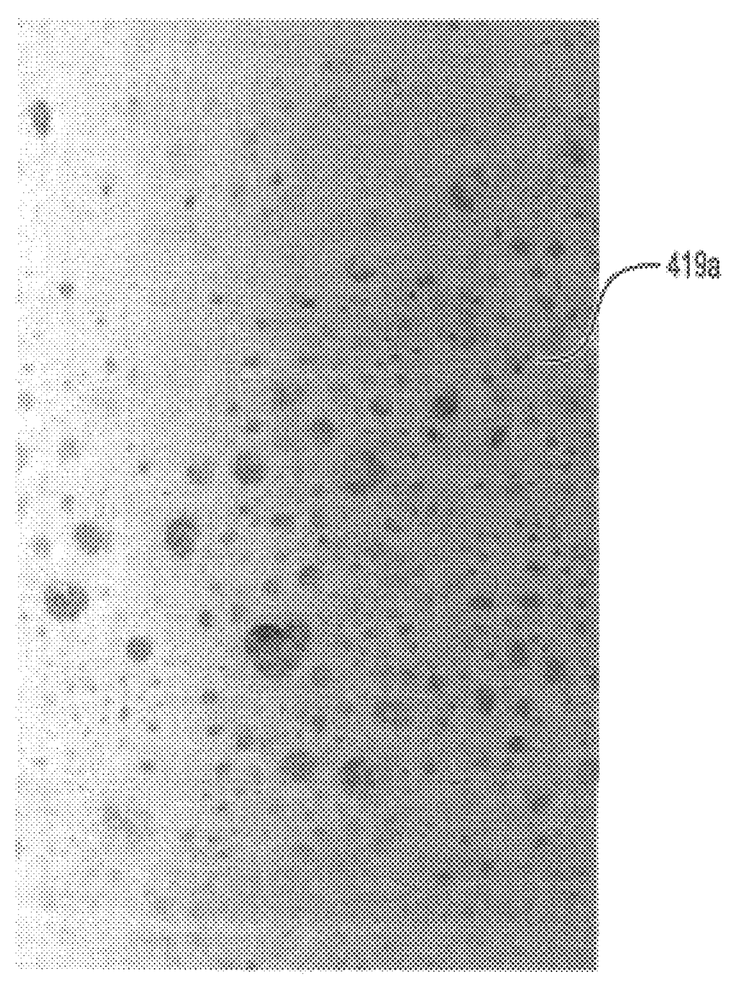

Although FIG. 4A 4C illustrate system 400 with a single fermenter 410, system 400 may include multiple fermenters 410. In one example, a single buffer 450 may provide flour to all fermenters 410. In another example, individual fermenters 410 may be provided with individual buffers 450.

Figure 5:
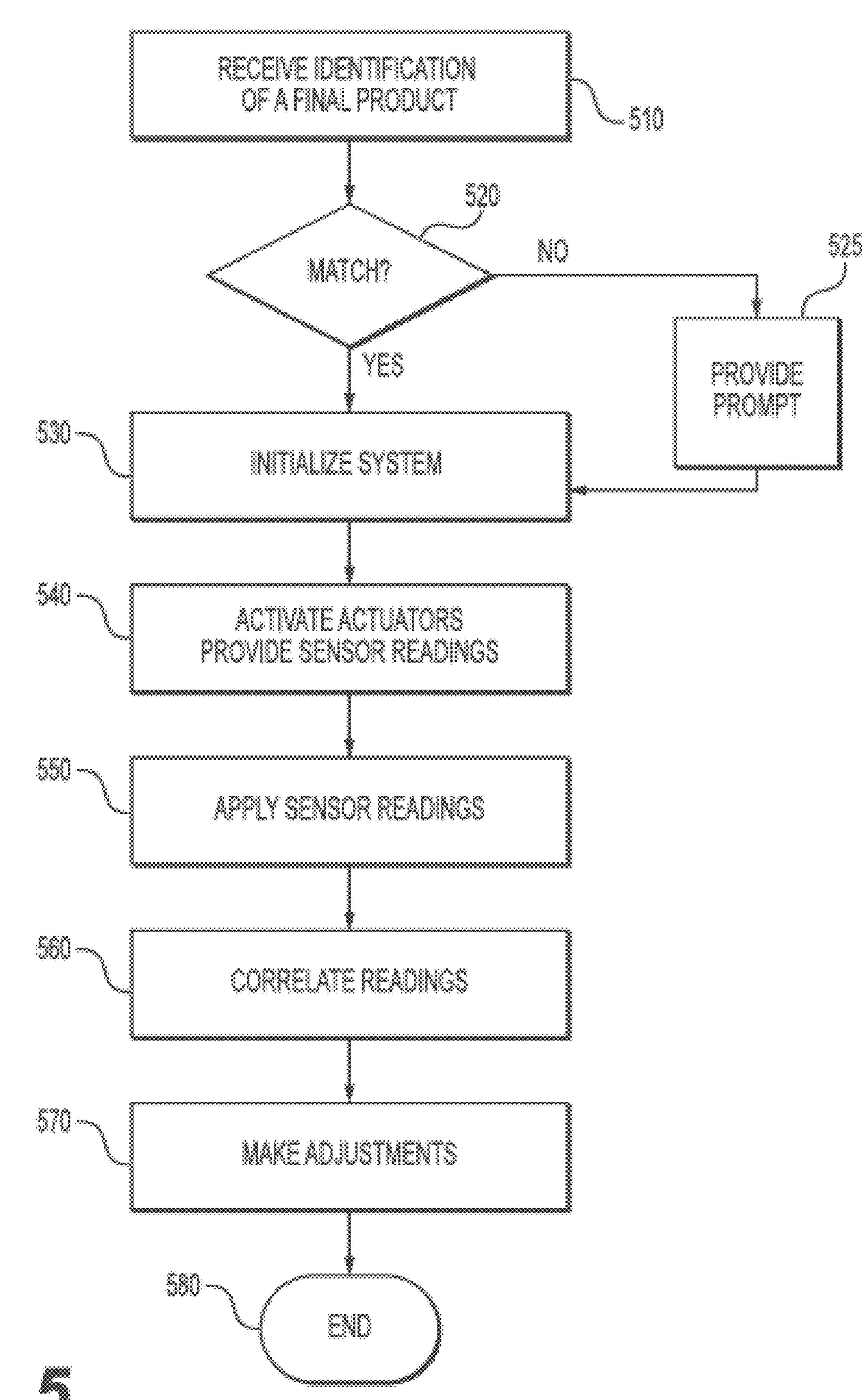
FIG. 5 illustrates an example computer-implemented process for sourdough starter production implemented using the example systems and components of FIGS. 3 and 4A.

FIG. 5 illustrates an example computer-implemented process for sourdough starter production implemented using the example systems and components of FIGS. 3, 4A-4C. In FIG. 5, operation 500 begins in block 510 when the processor 310 receives an identification of a final product (baked or not baked) for which a sourdough starter is to be produced. Alternately, the processor 310 may receive an identification of a specific sourdough starter to be produced. In block 520, the processor 310 determines if the identification matches an existing final product or sourdough starter whose characteristics are stored in the system 300. The identification may include a specific recipe. The identification and the recipe may be stored in the ledger system 360.

If the product or starter does not exist, the processor 310 may provide a prompt, block 525, through display 372, to enter a desired set of sourdough starter characteristics. For example, the sourdough starter may have, as desired characteristics, a specific final ratio of bacterial count to yeast activity of 1:2. The operation 500 then moves to block 530. If in block 520, the identification matches, the operation moves to block 530. In block 530, the processor 310 initializes the system 400, including activating the relevant sensors 470 (see FIG. 6; for example, a pH sensor and a $CO_2$ sensor) and setting the conditions for the fermenter 410. When the conditions are set for fermentation, the processor 310, block 540, activates the feeder 420 to provide the desired quantity of flour to the fermenter 410 and activates the water doser 430 to begin water addition. The addition of flour and water may continue in a batch mode. Coincident with the operations of block 540, the sensors (e.g., 411-415—see FIG. 4A) begin providing readings to the processor 310. In block 550, the processor 310 applies the sensor readings to a program, which, in one aspect may implement a processor-readable feedback loop, and which in another aspect, may implement a large language model, or other machine learning model to determine the degree of fermentation, or maturity (e.g., pH and $CO_2$ content) of the sourdough starter. The readings may be correlated, block 560, to determine an optimum ratio of the two values. In an aspect, the ratio of the readings may be compared to prior, or expected correlation curves (see FIG. 6). Alternately, the processor may use a single sensory output to evaluate when the desired sourdough starter maturity or fermentation is reached. The processor 310 may make adjustments, block 570, to the flour and water feed rates, periodicity, and timing, or other parameters of the system 400. When the readings are satisfactory (e.g., a desired/optimum final ratio or other indication of maturity is achieved), operation 500 moves to block 580 and ends.

FIG. 6 illustrates an example application of a machine learning model (MLM) to control operation of the system 400 of FIG. 4A, In FIG. 6, a sourdough mixture (flour and water, and possible additional compositions including LAB and yeasts) are added to fermenter/vessel 410/440 and allowed to ferment at a specified temperature with periodic re-feedings. One or more sensors (e.g., pH, CO temperature-represented in FIG. 6 as sensor 470) are activated by processor 310 to monitor conditions in the sourdough starter mixture and its environment, and to provide outputs to the processor 310 for analysis. The sensor 470 also may provide a display of sensed values to read out 372. The processor 310 executes trained machine learning model (MLM) 620, which may be implemented as, for example, a large language model (LLM), to analyze the sensed values and to generate control signals, as appropriate, to operate various components of the system 400 such as the feeder 420 and the water doser 430. For example, the MLM 620 may provide a control signal to supply a given amount of water, at a given rate and at a specific temperature. The MLM 620 may proceed though production of the sourdough starter until a desired endpoint or completion event occurs, with the endpoint being a desired maturity. For example, the fermentation process may continue until pH and $CO_2$ reach specified values and that, in addition, a ratio of pH to $CO_2$ is at a specified value. The ratio may indicate the maturity of the sourdough starter; that is the ratio may indicate the desired point of completion of the sourdough starter production for a specific batch. As shown in FIG. 6, chart 610 (which may be displayed in real-time as a readout on display 372 or display 460 (FIG. 4A)) illustrates one example of MLM control of the fermentation process through ratio determination in which curve 614 represents an idealized, desired, or historical, display of computed ratios and curve 612 represents a display of computed ratios for a current sourdough starter mixture. Although the foregoing refers to a ratio of parameter values, a similar control curve may be generated using only one parameter, such as pH only. As the two curves 612 and 614 illustrate in the example of pH and $CO_2$, the ratios are small (meaning yeast activity predominates) at the beginning of the fermentation process but increase as fermentation continues. A desired endpoint 615 may be provided, and may occur where the two curves cross for the second time. The MLM 620 may execute to evaluate progress to the endpoint 615, as well as an acceptable deviation between the curves during the fermentation process, and may provide signals to components of the system 400 to adjust their operations (e.g., flour dosing and water dosing) to keep the curves close to agreement. As noted above, alternatively, the curves displayed in chart 610 may be from a single sensor (e.g., pH). Additionally, multiple curves and charts may be generated; and the MLM 620 may be trained to interpret multiple curves as an indication of sourdough starter maturity. In a specific example, processor 310 executes the MLM 620 to receive sensor parameter data 622, applies algorithm 624 to evaluate the parameter data 622, and stores the evaluation (data 626). The processor 310 may further execute the algorithm 624 to provide automated control over components of the sourdough starter production system 400. Alternately or in addition, the processor 310 may execute the MLM 620 to generate alerts 628 for delivery or presentation to human operator of the system 400.

Figure 7:
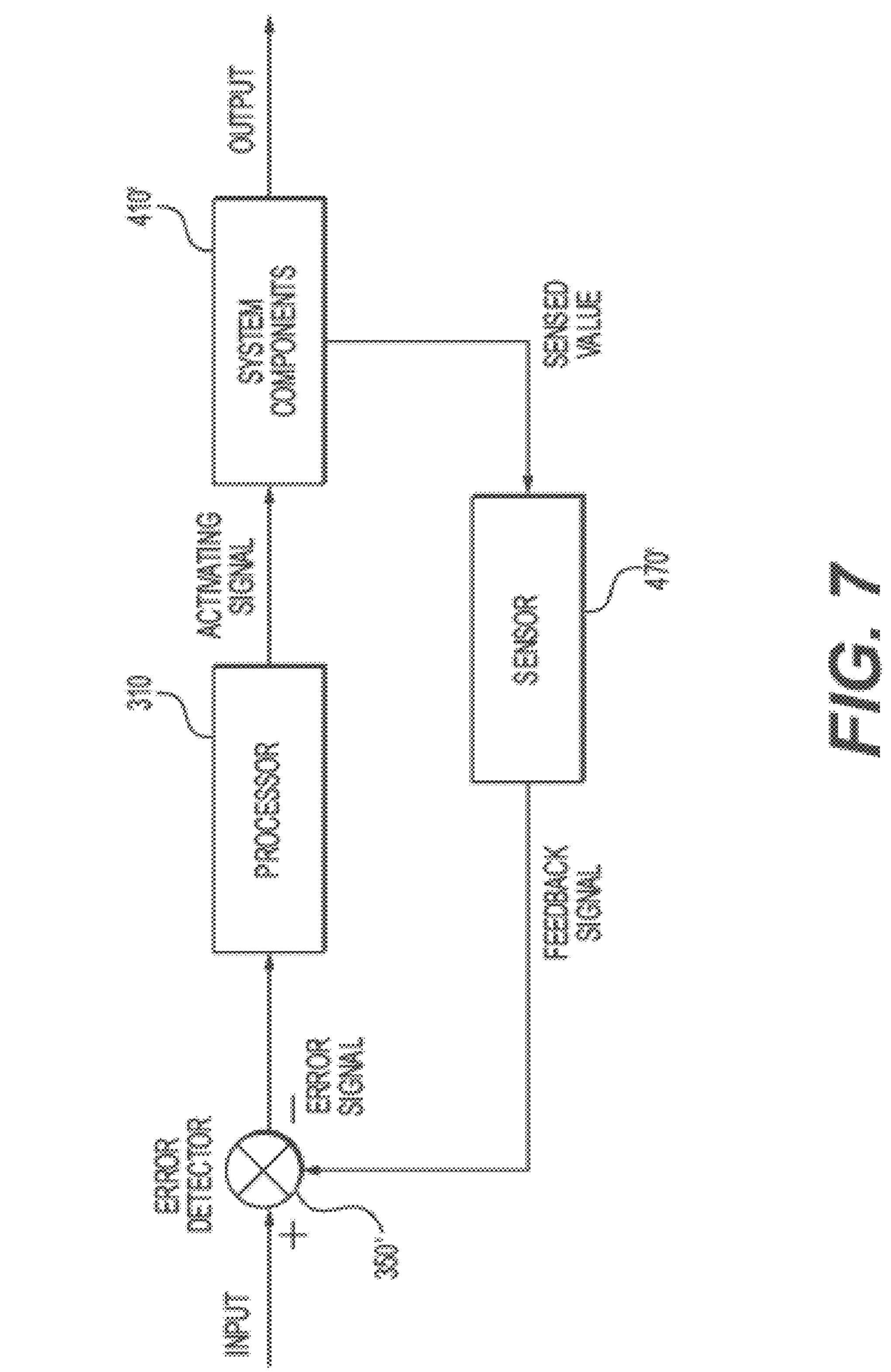
FIGS. 7 and 8 illustrate example closed loop feedback systems for controlling operation of the systems and components of FIGS. 3 and 4A.

Rather than control by implementation of a MLM, the system 400 may be controlled by processor 310 executing a closed loop feedback mechanism. FIG. 7 illustrates application of an example feedback and control loop to control operation of the herein disclosed fermentation system 400. In an aspect, the system 400 of FIG. 4A could be operated as a single degree of freedom system where only pH or $CO_2$ concentration (that is, a single parameter for maturity determination), for example, are to be sensed and to be controlled. With reference to FIGS. 3 and 4A, in FIG. 7, feedback control loop 700 includes system components 410', such as fermenter 410, which is instrumented with sensor 470', which in turn provides a feedback signal to error detector 350', which is a component of program 350. The error detector 350' is executed by processor 310, which generates an actuator signal to control one or more components 410', such as the feeder 420 and/or water doser 430, to provide, for example, flour and water to the fermenter 410. In an aspect, the sensor 470' is a pH sensor, and the processor 310 controls re-feeding through analysis of the sensed pH value, alone. Alternately, sensor 470' could sense $CO_2$ concentration.

Figure 8:
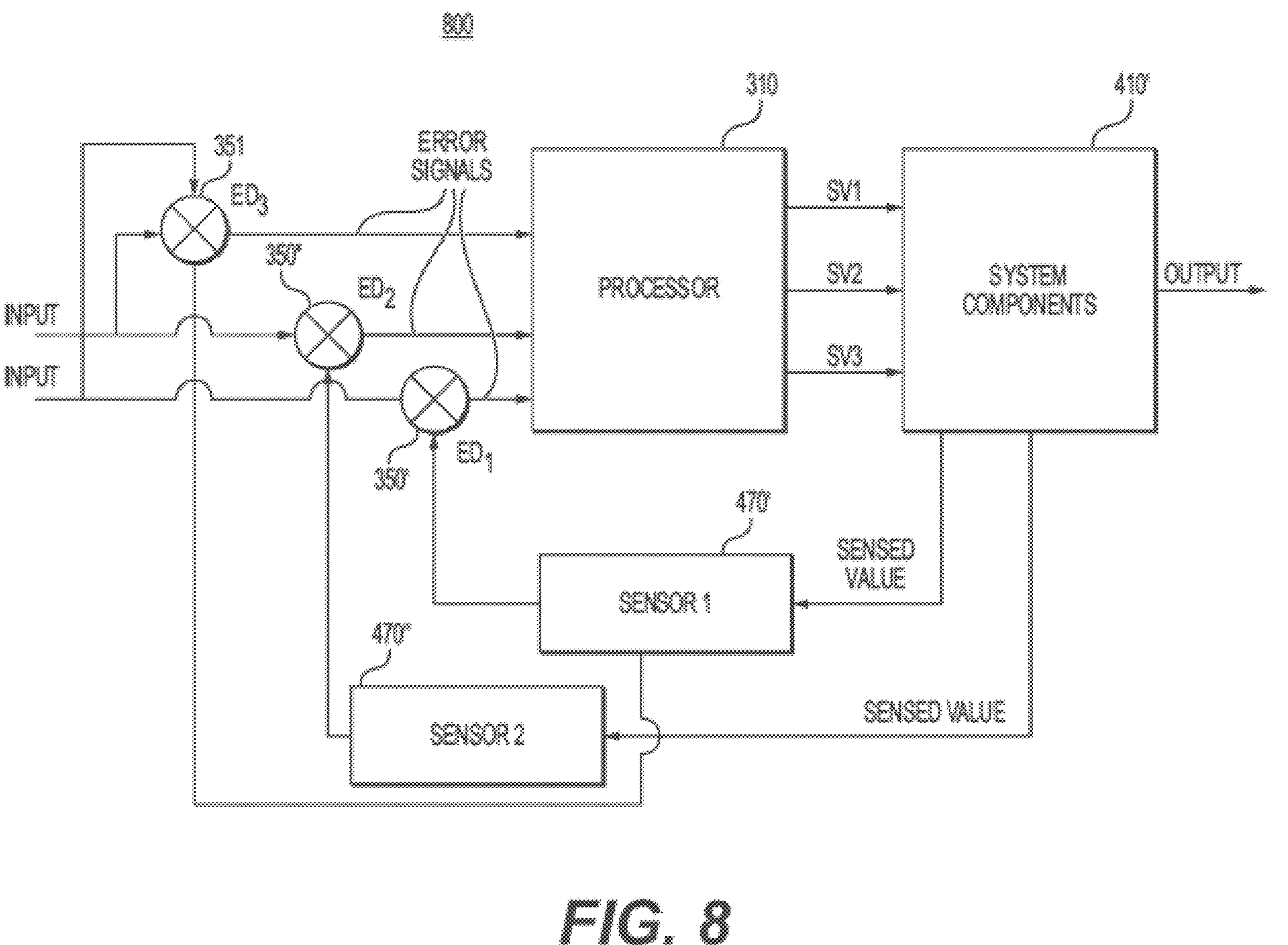

FIG. 8 illustrates application of another example feedback and control loop to control a two or more degree of freedom system, such as the system 400 of FIG. 4A. For example, the system 400 may be said to be at least a two degree of freedom system when both pH and $CO_2$ concentration are independently sensed/controlled. Moreover, a ratio of the two measurable parameters may be used for control. In FIG. 8, with reference to FIGS. 3 and 4A, closed loop feedback system 800 includes system components 410' (e.g., fermenter 410) instrumented with a first sensor 470' and a second sensor 470". Each sensor sends a feedback signal to an associated error detector 350' and 350". The two sensor also send the feedback signal to error detector 351. Error detector 351 differs in operation from error detectors 350' and 350" in that error detector 351 combines the sensed values to generate a ratio of the two sensed values, and compares the generated ratio to a desired or expected ratio to generate an error signal. The processor 310 uses the error signal to generate actuating signals SV1, SV2, and, optionally SV3, to operate system components to adjust flour and water addition to the fermenter 410.

The application of FIG. 6 relies on artificial intelligence (AI) techniques (for example, a machine learning model (MLM), a further example of which may be a large language model (LLM)). The control systems of FIGS. 7 and 8 rely on feedback loops that differ in complexity. The feedback loops include error correctors. The error correctors are example of programs that are "trained" to provide a specific function. Thus, the systems and components of FIG. 6-8 employ some types of AI devices and techniques. These AI devices, as disclosed herein, include AI models. AI models include machine learning models. Machine learning models, as noted above, may include large language models. Large language models include artificial neural networks. Large language models also include "conversational" models. As noted herein, AI models that are sophisticated and well trained have the potential to improve the consistency of sourdough starter production and corresponding sourdough baking. Improving sourdough starter production consistency has the potential to transform what is currently very much an artisanal, one-off process into a process approaching mass-production scale. This transformation may be achieved by using a properly-trained AI model to control, at some level, sourdough starter production. These statements beg the question, how is an AI model "properly trained"? A solution that provides proper training for the herein disclosed AI models is illustrated in FIG. 9A-11.

Figure 9A:
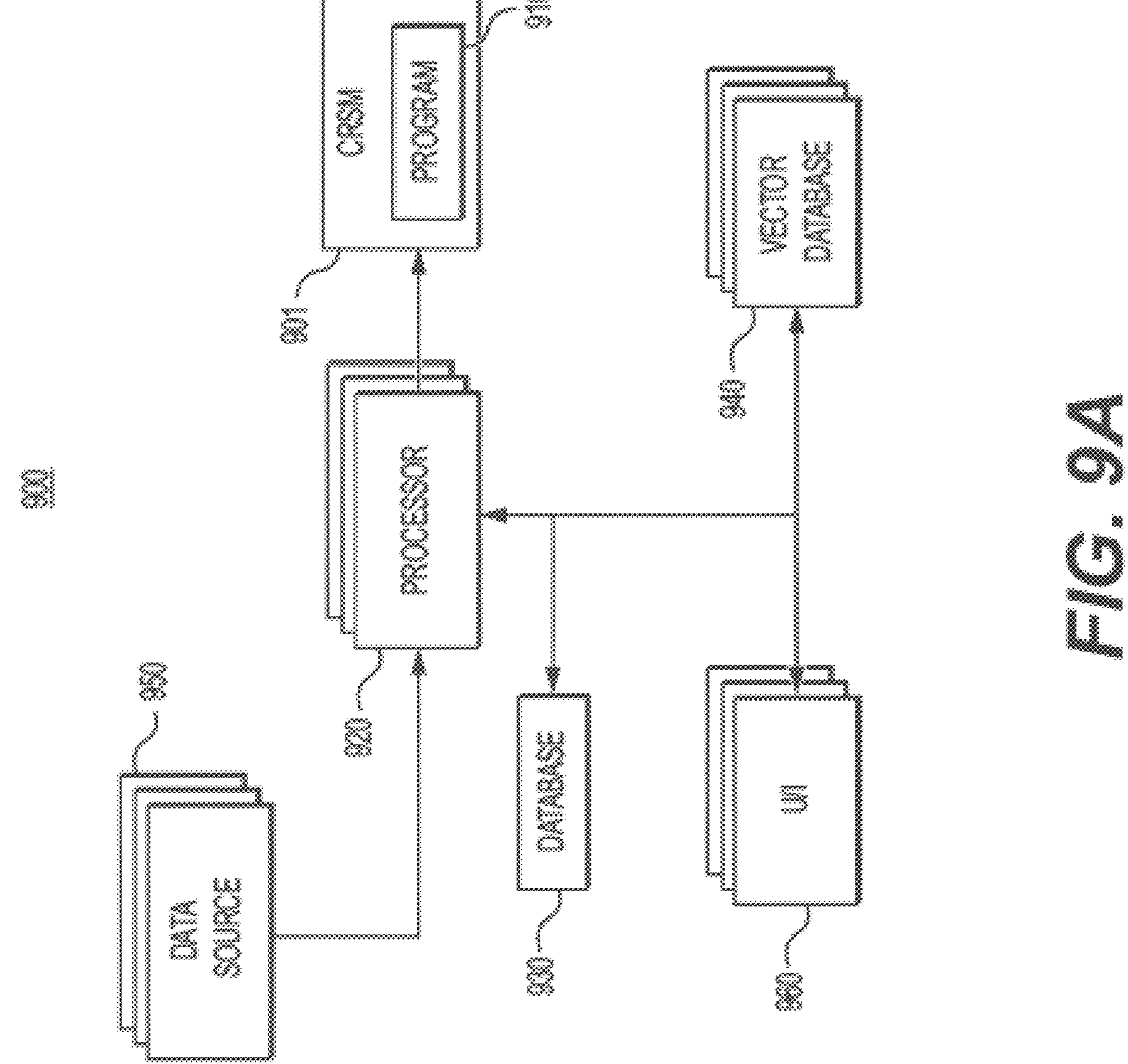
FIGS. 9A and 9B illustrate an example computer network configured to implement artificial intelligence systems and corresponding methods so as to control operations of the example sourdough starter production system of FIG. 4A.
Figure 9B:
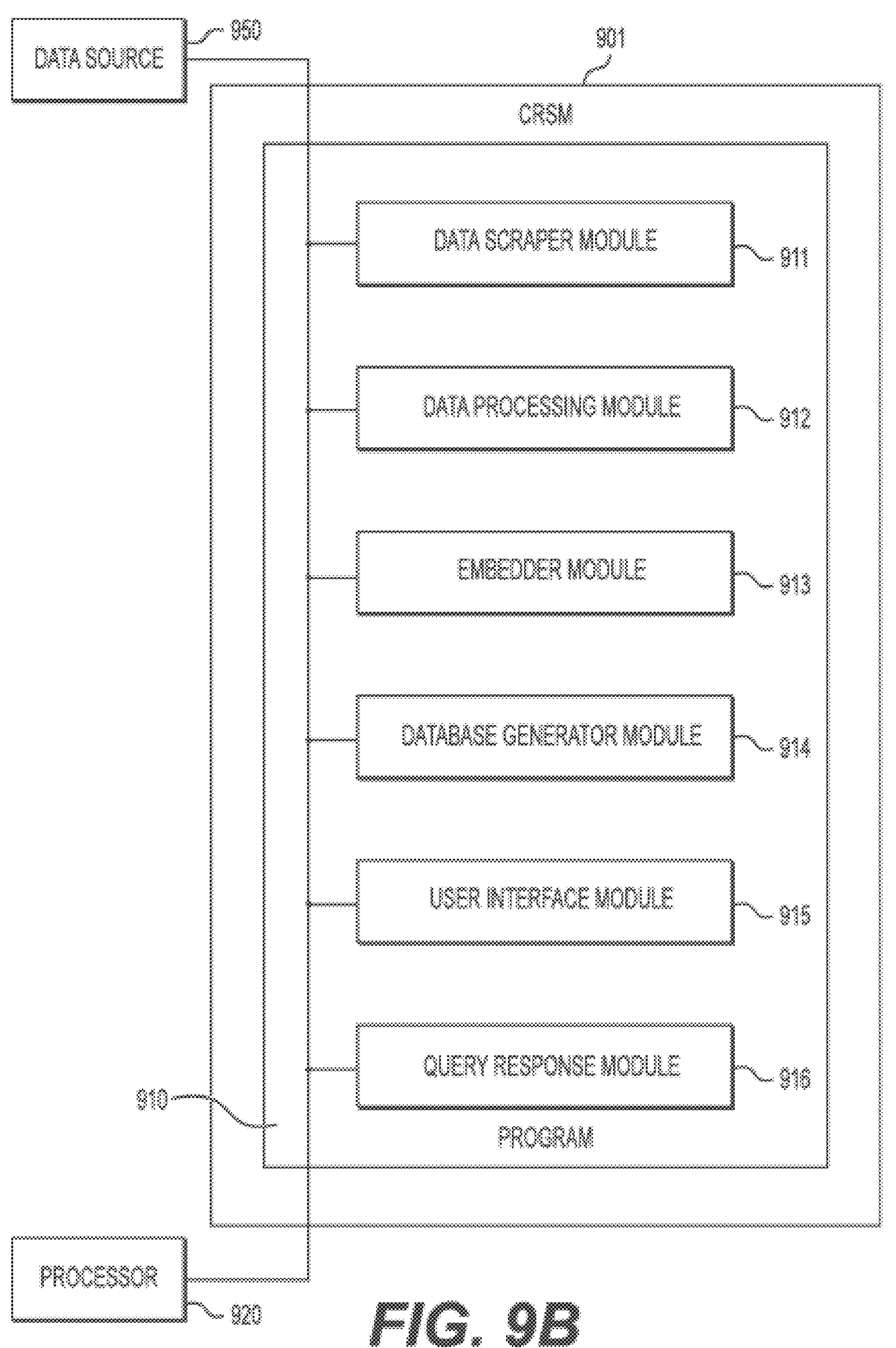

FIG. **9*a* illustrates an example computer system 900 and corresponding program 910 executable on one or more processors to implement the herein disclosed artificial intelligence techniques, including training, updating, and executing the machine learning model (MLM) 620 of FIG. 6. FIG. 9B illustrates an example of the program 910 useable for training and updating the MLM. Note that in an aspect, the MLM may be a LLM, which in turn may be an artificial neural network (ANN). Alternately, the LLM may be a "conversational" model. Other machine learning models may be employed in addition to or in place of the LLM or ANN. In FIGS. 9A and 9B, computer program 910, which may be stored on non-transient computer-readable storage medium 901, includes data acquisition module 911, data processing module 912, embeddings module 913, database generator module 914, user interface module 915, and query response module 916. One or more processors 920 may access the program 910, upload all or portions of the program 910 to memory 925, and execute machine instructions or scripts associated with the uploaded program 910. In an example, the modules are written using Python scripts, which then are invoked to execute the herein disclosed methods. The Python scripts work together to retrieve, process, and analyze data retrieved or accessed from data sources 950. In one example, the data sources 950 provide articles or other information related to sourdough starter formulation and sourdough baking. The processors 920 may use various libraries such as os, json, pathlib, time, requests, lxml, csv, pandas, pinecone, dotenv, openai, embedding, and more. In an aspect, one or more of the above-disclosed modules may be included in the program 910. Thus, a processor 920 executes the program 910, and such execution is shown in the non-inclusive flowcharts of FIGS. 14-21**.

Figure 10:
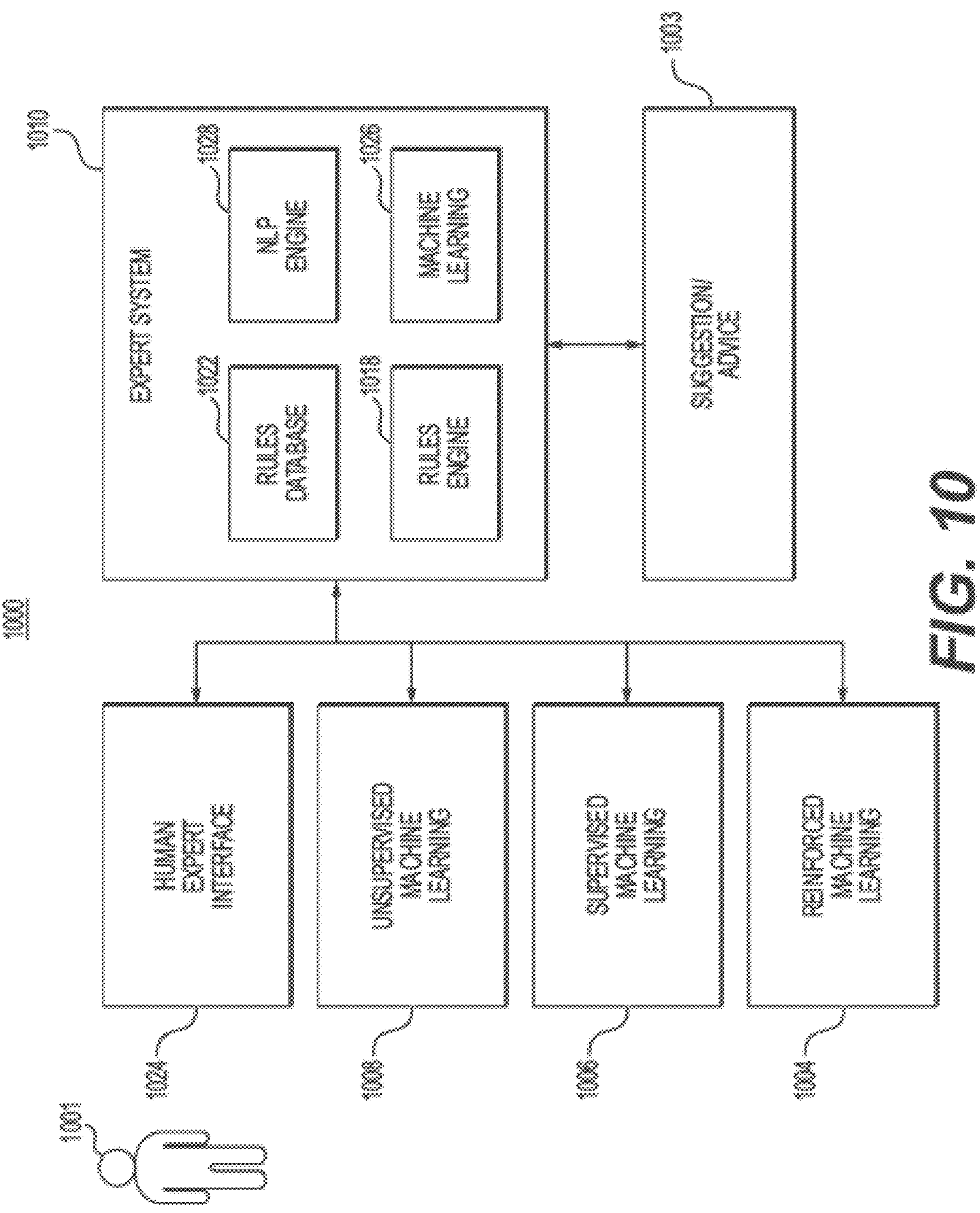
FIG. 10 illustrates an example system for machine learning for components of the artificial intelligence systems.

FIG. 10 illustrates an example system for machine learning. In FIG. 10, system 1000 utilizes a human expert interface 1024 (e.g., a graphical user interface (GUI)). A human expert 1001 may operate and receive information through the human expert interface 1024. The human expert interface 1024 may be operated to implement various actions, including operating a natural language processor (NLP), which is part of NLP engine 1028. The human expert interface 1024 allows expert 1001 to implement at least three stages of machine learning, namely unsupervised machine learning, supervised machine learning, and reinforced (i.e., learning through feedback) machine learning. System 1000 includes an unsupervised machine-learning module 1008. The unsupervised machine-learning module 1008 may be used to allow the NLP engine 1028 and the machine learning model 620 using processor 910 (see FIGS. 6, 9A, and 9B) to learn new words/phrases; learn new machine data and sensor data patterns; etc. System 1000 includes supervised machine-learning module 1006. The supervised machine-learning module 1006 may refine words/phrases, implement NLP models, etc. System 1000 includes reinforcement machine-learning module 1004. The reinforcement machine-learning module 1004 may refine words/phrases, implement NLP models, and determine data patterns, for example. Components of system 1000 also include expert system 1010. Expert system 1010 is used to initially train, and then re-train, the machine learning model 620. Expert system 1010 includes NLP engine 1028, rules database 1022, rules engine 1018, and machine learning module 1026. Finally, the expert system 1010, using, for example, the NLP engine 1028 and the machine learning model 620, may generate suggestions and alerts 1003 related to operation of the system 400 of FIG. 4A.

Figure 11:
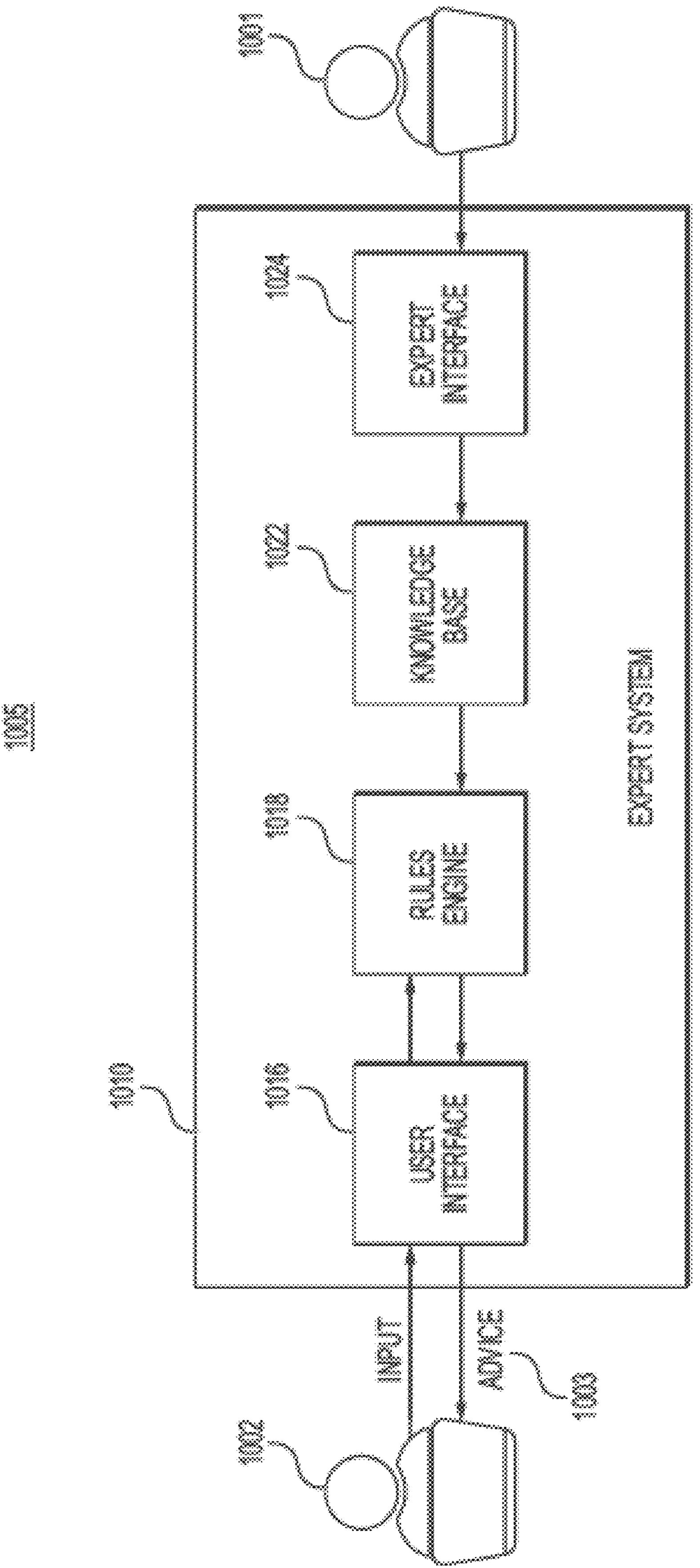
FIG. 11 illustrates aspects of an example expert system showing transmission of expert information through an expert interface to a user.

FIG. 11 presents an example chart 1005 illustrating transmission of expert information through expert interface 1024 to operator 1002 by way of user interface 1016. As can be seen in FIG. 11, an expert 1001 interacts with expert system 1010 using expert interface 1024. As an example, expert 1001 may use expert interface 1024 to annotate, comment on, correct, or add insights to components of knowledge base 1022. In this example, the expert 1001 may comment on anomalous readings or data the expert detects during a most recent operation of the sourdough starter production system 400 of FIG. 4A, where the most recent operation is recorded in the knowledge base 1022 (also see, for example, data recorded by MLM 620 during specific sourdough starter processes in data 626 and in ledger system 360 of FIG. 3). The expert system 1010, and particularly the NLP engine 1028 and machine learning engine 1026 may apply the expert's comments, according to rules engine 1018, to indicate to the user 1002, through user interface 1016, a need or suggestion to modify an operational aspect of the system 400 in a future operation.

Figure 12:
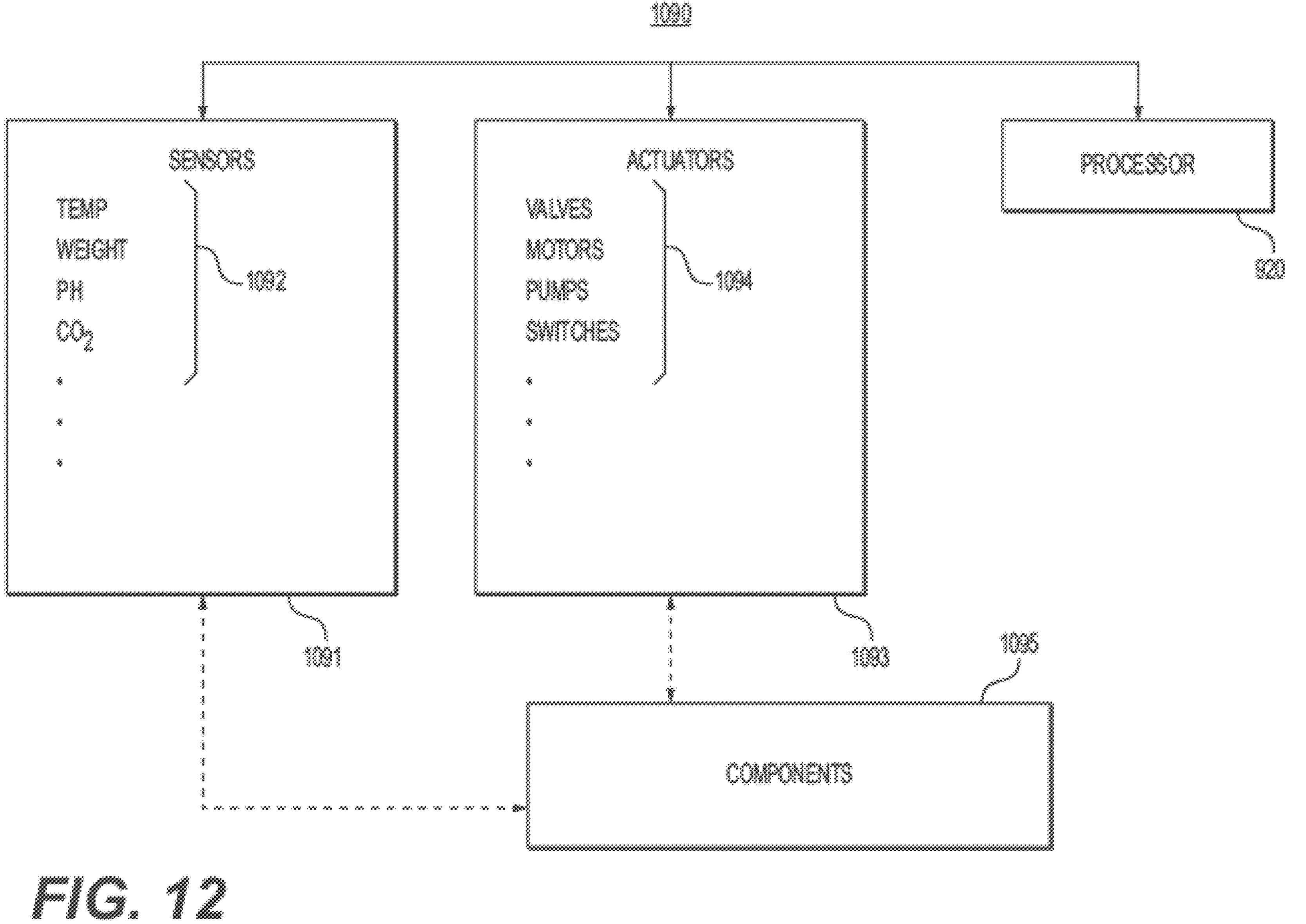
FIG. 12 illustrates an example actuator/sensor system operable in the example sourdough production system of FIG. 4A.

FIG. 12 illustrates an example actuator/sensor system that may be employed with the sourdough starter production system of FIG. 4A. In FIG. 12, actuator/sensor system 1090 includes actuator subsystem 1093 including actuators 1094, and sensor subsystem 1091, including sensors 1092. Actuators 1094 may include solenoid operators for isolation or diversion valves, switches for operating heaters and coolers, motor controllers for operating mixers, aerators, augers, conveyors or other material supply devices, and other components. The sensors 1092 may include sensors for monitoring fluid temperature, pH, $CO_2$, pressures, weights, and other fluid characteristics and environmental parameters of relevance to operation of the system 400. The sensors 1092 may correspond to the sensors shown in FIGS. 4A, 6, 7, and 8. The actuators 1094 may operate to control movement or other operations of the various components of FIGS. 4A, 6, 7, and 8. Thus, as shown in FIG. 12, the sensors 1092 and actuators 1094 communicate with, sense operations of, and control operations of components 1095.

Figure 13:
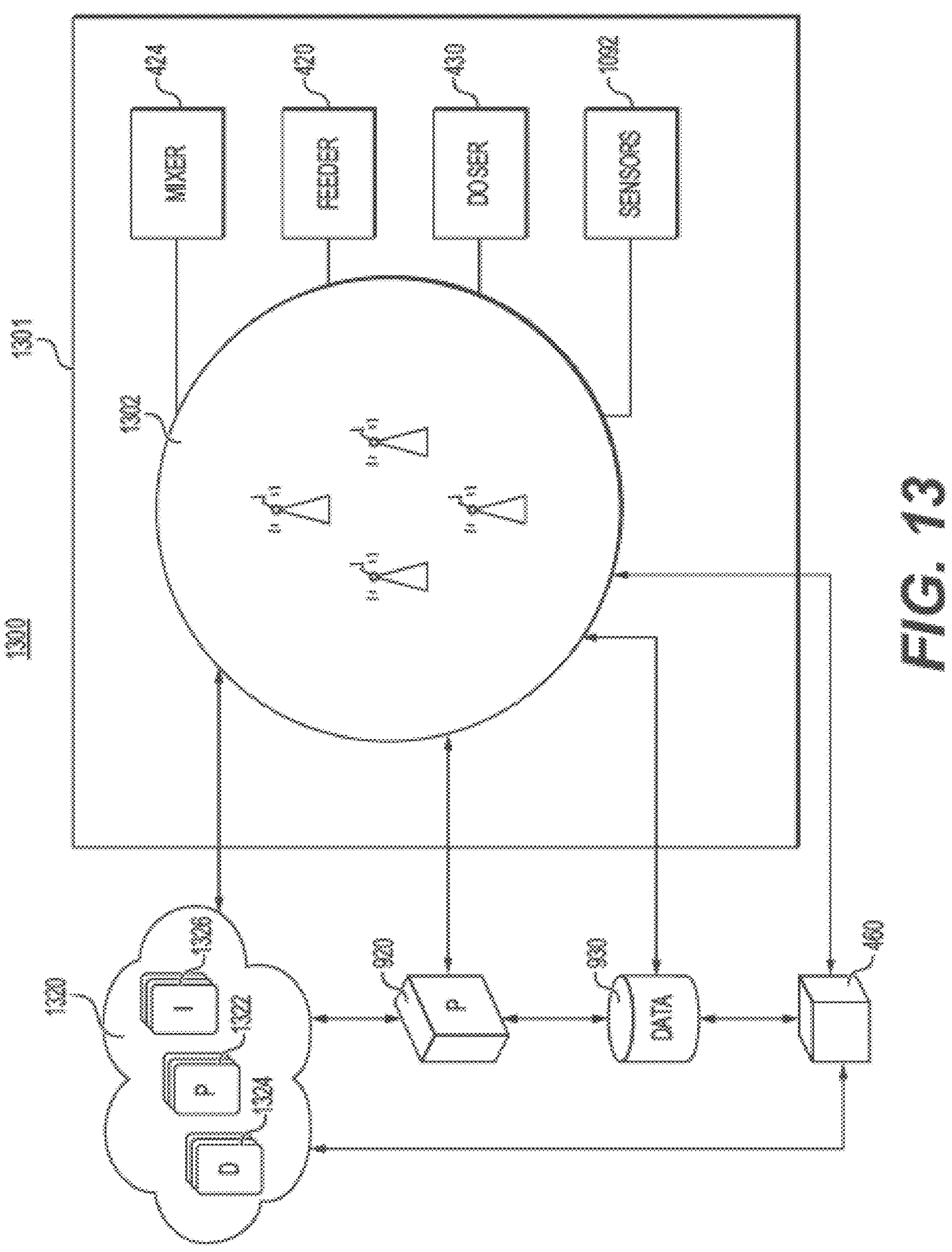
FIG. 13 illustrates an example data collection system for use with the example sourdough production system of FIG. 4A.

FIG. 13 illustrates an implementation of a control system for a single or multiple, geographically separated, sourdough starter production facilities (and associated sourdough bakeries). In FIG. 13, control system 1300 includes local control components 1301 in communication with one or more local processors 920, local database 930, and local mobile interface 460. The local control components 1301 are further in communication with cloud-based service 1320. The cloud-based service 1320 includes multiple remote processors 1322 and remote database 1324. The remote database(s) may implement a version of a permissioned distributed (and immutable) ledger. A local sourdough starter production facility may communicate with its own local processor(s) 920 or with the cloud-based service 1320 for some data processing needs. For multiple, related sourdough starter production facilities, using the cloud-based service 1320 may provide more consistent sourdough starter production across a network of related local sourdough bakeries than might occur by using individual local processors 920.

As can be seen in FIG. 13, local components (mixer 424, feeder 420, doser 430, and sensors 920) of example local sourdough starter production facility 1301 are in signal communication with local processing components and cloud based processing components using communication devices 1302. Such communication may be implemented using wireless channels including routers, radios, and antenna, or is the example of local connectivity, using Bluetooth™ or wired communications. When connecting to the cloud-based service 1320, a user may operate interface 460 to connect to a corresponding interface 1326. In this way, the interface 460 may operate as a "dumb" terminal, and all or most data processing operations are executed by a processor 1322. However, data from such operations may be stored locally (i.e., in ledger system 360) as well as in data stores 1324.

As noted above, artificial intelligence (AI) systems or AI models are employed in a variety of technical and commercial applications. AI models include machine learning models. Machine learning models include large language models. Large language models include artificial neural networks. Large language models also include "conversational" models. As noted herein, AI models that are sophisticated and well trained have the potential to improve the consistency of sourdough starter production and corresponding sourdough baking. Improving sourdough starter production consistency has the potential to transform what is currently very much an artisanal, one-off process into a process approaching mass-production scale. This transformation may be achieved by using a properly-trained AI model to control, at some level, sourdough starter production. These statements beg the question, how is an AI model "properly trained"?

The preceding disclosure refers to flowcharts and accompanying descriptions to illustrate the example represented in the Figures. The disclosed devices, components, and systems contemplate using or implementing any suitable technique for performing the steps illustrated. Thus, the Figures are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A system for unattended production and maintenance of a sourdough starter, comprising:
- a fermenter configured to receive a mixture of flour and water for sourdough starter production;
- a processor-controlled feeder configured to deliver additions of flour to the fermenter;
- a pH sensor disposed to sense a pH of contents of the fermenter and in signal communication with a processor; and
- a non-transitory computer-readable storage medium storing instructions that, when executed by the processor, cause the processor to:
  - periodically acquire pH values from the pH sensor at a sampling interval,
  - compare the pH values to a target pH range defined by a lower value and an upper value,
  - generate a control signal to activate the feeder to deliver a predetermined quantity of flour to the fermenter when the pH values cross the lower value and to inhibit flour delivery while the pH values remain within the target pH range, and
  - continue periodic acquisition and comparison without operator intervention to drive the sourdough starter toward a target pH endpoint.

2. The system of claim 1, further comprising:
- a water doser configurable to provide a fixed ratio of water-to-flour delivery, wherein the instructions further cause the processor, upon detection that the pH values remain outside the target pH range, to command the feeder and the water doser to deliver a refeeding quantity at the fixed ratio of flour-to-water, wherein initiation and termination of refeeding occur based solely on the pH values.

3. The system of claim 2, wherein the processor controls repeated refeeding activations during a single fermentation operation.

4. The system of claim 1, wherein the sampling interval is a programmable period and the instructions require that the pH values exceed the target pH range before any subsequent activation of the feeder can occur after a delivery commanded in response to a pH value below the target pH range.

5. The system of claim 1, wherein the processor computes successive pH values over a defined window and evaluates the successive pH values.

6. The system of claim 1, wherein the predetermined quantity of flour delivered by the feeder increases proportionally to a magnitude of a pH error defined as a difference between an expected pH value and a most recently-measured pH value.

7. The system of claim 1, wherein the processor records each sampling time, each pH value, and each control signal in ledger that identifies a batch of the sourdough starter.

8. The system of claim 1, wherein the processor, based on a signal from a fermenter level sensor, inhibits feeder activation upon detection of a fermenter level above a high-level sensor value and resumes closed-loop control upon return below the high-level sensor value.

9. The system of claim 1, wherein the fermenter resides within a temperature-controlled jacket and the instructions are executed to maintain a controlled temperature while controlling flour delivery based solely on the pH values.

10. The system of claim 1, wherein the feeder is chosen from a group consisting of an auger, a powered mechanical conveyor, a gravity feeder, a batch feeder, or a vacuum conveyor.

11. The system of claim 1, wherein removal of a portion of the sourdough starter comprises removal of the portion from the contents of the fermenter to establish consistent refeeding events initiated by the pH values.

12. The system of claim 1, wherein the instructions declare attainment of the target pH value upon reaching a pre-defined endpoint.

13. A computer-implemented method for unattended sourdough starter control, comprising:

periodically acquiring, by a processor from a pH sensor in a fermenter, pH values of a sourdough starter;

comparing, by the processor, the pH values to a target pH range defined by a lower pH value and an upper pH value;

commanding, by the processor, a feeder to deliver a predetermined quantity of flour to the fermenter upon detection that the pH values cross the lower pH value;

inhibiting, by the processor, flour delivery while the pH values remain within the target pH range and until the pH values exceed the upper pH value; and repeating the acquiring, comparing, commanding, and inhibiting without operator intervention to drive the sourdough starter toward a desired pH value.

14. The method of claim 13, further comprising initiating, by the processor, a refeeding cycle that commands the feeder and a water doser to deliver a refeeding quantity at a predefined flour-to-water ratio, wherein initiation and termination of the refeeding occur based solely on the pH values.

15. The method of claim 13, further comprising computing successive pH values and comparing the successive pH values to the target pH range before commanding flour delivery.

16. The method of claim 13, wherein the processor adjusts the predetermined quantity of flour proportionally to a magnitude of a pH error that equals a difference between an expected pH value and a most recent pH value.

17. The method of claim 13, further comprising recording each sampling time, each pH value, and each command to the feeder in a ledger that identifies a batch of the sourdough starter.

18. The method of claim 13, further comprising declaring, by the processor, attainment of the desired pH value upon attainment of a pre-defined endpoint.

19. A sourdough starter production pipeline, comprising:

a fermenter configured to receive flour and water, mix the flour and the water, and control fermentation of a mixture of the flour and the water, wherein the fermenter is encased in a second vessel configured with temperature control components that allow provision of a controlled temperature environment on contents of the fermenter;

a feeder configured to provide initial quantities the flour to the fermenter and to provide additions of the flour to the fermenter;

a water doser configured to provide initial quantities of the water to the fermenter and to provide additions of water to the fermenter;

a first sensor that senses first parameter values indicative of progress toward a desired fermentation of the mixture of flour and the water; and a processor that executes a program of instructions encoded on a non-transitory, computer-readable storage medium to receive the first parameter values, and apply the received first parameter values to a trained machine learning component, wherein the machine learning component analyzes the first parameter values and provides a control signal indicating rates and quantities of flour addition and a rates and quantities of water addition to the fermenter to achieve a desired fermentation of the mixture of flour and water, wherein the processor receives temperature data from the fermenter and provides control signals to the second vessel to adjust a temperature of the contents of the fermenter.

20. The sourdough starter production pipeline of claim 19, wherein the first sensor is a pH sensor.

21. A system for unattended production and readiness determination of a sourdough starter, comprising:

a fermenter configured to receive flour and water and to contain a sourdough starter;

a feeder configured to provide additions of flour to the fermenter;

a water doser configured to provide additions of water to the fermenter;

a pH sensor configured to sense acidity of the sourdough starter and to provide sensed pH values;

a processor in signal communication with the pH sensor, the feeder, and the water doser; and a non-transitory computer-readable storage medium storing a program executed by the processor, wherein execution of the program causes the processor to receive the sensed pH values from the pH sensor, compare the sensed pH values to one or more expected pH values indicative of sourdough starter maturity, control operation of the feeder and the water doser based solely on the sensed pH values to perform refeeding of the sourdough starter, and determine readiness of the sourdough starter for use in artisanal baking when the sensed pH values correspond to the expected pH values.

22. The system of claim 21, wherein the processor controls refeeding by activating the feeder and the water doser when the sensed pH values indicate acidification of the sourdough starter beyond an expected pH value.

23. The system of claim 21, wherein operation of the feeder and the water doser stops when the sensed pH values indicate attainment of a desired sourdough starter maturity.

24. The system of claim 21, wherein the processor performs refeeding by controlling removal of a portion of the sourdough starter from the fermenter prior to providing additions of flour and water.

25. The system of claim 21, wherein the processor determines readiness of the sourdough starter for artisanal baking based on evaluating progress of the sensed pH values within a defined acidity range toward a desired endpoint.

26. The system of claim 21, wherein the processor executes an error detection function that determines a difference between the sensed pH values and the expected pH values and generates control signals for the feeder and the water doser based on the difference.

27. The system of claim 21, wherein the fermenter is encased within a double-jacketed vessel configured to control temperature of contents of the fermenter while refeeding and readiness determination remain based solely on the sensed pH values.

28. The system of claim 21, wherein the processor records the sensed pH values and corresponding feeder and water doser operations as data associated with a sourdough starter batch.

* * * * *